United States Patent
Minaburo et al.

(10) Patent No.: US 11,303,738 B2
(45) Date of Patent: Apr. 12, 2022

(54) METHOD AND APPARATUS PROCESSING OF MESSAGE DATA

(71) Applicant: ACKLIO, Cesson-Sevigne (FR)

(72) Inventors: Ana Minaburo, Cesson-Sevigne (FR); Alexander Pelov, Cesson-Sevigne (FR)

(73) Assignee: ACKLIO, Cesson-Sevigne (FR)

( * ) Notice: Subject to any disclaimer, the term of this patent is extended or adjusted under 35 U.S.C. 154(b) by 0 days.

(21) Appl. No.: 16/980,403

(22) PCT Filed: Mar. 13, 2019

(86) PCT No.: PCT/EP2019/056338
§ 371 (c)(1),
(2) Date: Sep. 13, 2020

(87) PCT Pub. No.: WO2019/175275
PCT Pub. Date: Sep. 19, 2019

(65) Prior Publication Data
US 2021/0051218 A1 Feb. 18, 2021

(30) Foreign Application Priority Data
Mar. 16, 2018 (EP) .................................... 18305301

(51) Int. Cl.
*H04L 29/06* (2006.01)
*H04L 69/22* (2022.01)
(Continued)

(52) U.S. Cl.
CPC .......... *H04L 69/22* (2013.01); *H04L 61/1511* (2013.01); *H04L 61/2007* (2013.01);
(Continued)

(58) Field of Classification Search
CPC . H04L 69/22; H04L 61/1511; H04L 61/2007; H04L 63/0428; H04L 61/6022
See application file for complete search history.

(56) References Cited

U.S. PATENT DOCUMENTS 7,188,250 B1 * 3/2007 Alfieri ...................... H04L 9/06
713/161
8,612,530 B1 * 12/2013 Sapovalovs ............. H04L 43/50
709/206

(Continued)

FOREIGN PATENT DOCUMENTS

| WO | 2013/088323 A2 | 6/2013 |
| WO | 2016/206742 A1 | 12/2016 |

OTHER PUBLICATIONS

Choi, et al., "Improve IPv6 global connectivity for 6LoWPAN", 13th International Conference on Advanced Communication Technology (ICACT2011), pp. 1007-1010, Feb. 13, 2011.

(Continued)

*Primary Examiner* — Jimmy H Tran
(74) *Attorney, Agent, or Firm* — BakerHostetler

(57) ABSTRACT

Data messages such as data packets in an IPv4 or IPv6 format are processed with a view to compression/decompression, using information obtained from sources other than the field data packet itself, or the stream to which it belongs. This may involve additional dynamic processing defined in specifications identified by a shared marker, or obtained from an additional data source such as a static file, database application or the like. Embodiments described herein enhance this approach with a dynamic determination of data components.

19 Claims, 9 Drawing Sheets

(51) Int. Cl.
*H04L 61/4511* (2022.01)
*H04L 61/5007* (2022.01)
*H04L 67/02* (2022.01)
*H04L 69/04* (2022.01)
*H04L 101/622* (2022.01)

(52) U.S. Cl.
CPC ........ *H04L 63/0428* (2013.01); *H04L 63/062* (2013.01); *H04L 67/02* (2013.01); *H04L 69/04* (2013.01); *H04L 61/6022* (2013.01)

(56) References Cited

U.S. PATENT DOCUMENTS

| | | | | |
|---|---|---|---|---|
| 2004/0081151 A1* | 4/2004 | Greis | ............... | H04L 69/161 370/392 |
| 2004/0264433 A1* | 12/2004 | Melpignano | ......... | H04L 65/607 370/349 |
| 2005/0004916 A1* | 1/2005 | Miller | ............... | H04L 67/1046 |
| 2005/0083944 A1* | 4/2005 | Liu | ........................ | H04L 69/22 370/395.5 |
| 2007/0253430 A1* | 11/2007 | Minami | ............. | H04L 12/2898 370/395.52 |
| 2008/0089339 A1* | 4/2008 | Tsirtsis | ............... | H04W 28/06 370/392 |
| 2008/0089357 A1* | 4/2008 | Park | ....................... | H03M 7/30 370/465 |
| 2008/0279188 A1* | 11/2008 | Alfieri | ................. | H04L 69/166 370/392 |
| 2009/0135728 A1* | 5/2009 | Shen | ....................... | H04L 43/12 370/250 |
| 2010/0312941 A1* | 12/2010 | Aloni | .................... | H04L 49/90 710/310 |
| 2013/0107895 A1* | 5/2013 | Wentink | ................. | H04L 69/04 370/477 |
| 2014/0369365 A1* | 12/2014 | Denio | .................... | H04L 69/16 370/474 |
| 2015/0304184 A1* | 10/2015 | Ruddick | ................ | H04L 43/12 370/252 |
| 2016/0191466 A1 | 6/2016 | Pernicha | | |
| 2016/0285671 A1* | 9/2016 | Rangarajan | ........... | H04L 67/327 |
| 2017/0170986 A1* | 6/2017 | Kumar | ................... | H04L 69/16 |
| 2017/0264600 A1* | 9/2017 | Froelicher | ........... | H04L 61/6004 |
| 2017/0359254 A1* | 12/2017 | Oran | .................... | H04L 67/327 |
| 2018/0097722 A1* | 4/2018 | Callard | ................. | H04L 45/38 |
| 2018/0103128 A1* | 4/2018 | Muscariello | ........... | H04L 69/22 |
| 2018/0375841 A1* | 12/2018 | Tola | .................... | H04L 67/2833 |
| 2019/0260631 A1* | 8/2019 | Schmeelk | ............... | H04L 43/18 |
| 2020/0022022 A1* | 1/2020 | Ly | ......................... | H04W 28/06 |
| 2020/0120075 A1* | 4/2020 | Cela | ........................ | G06F 21/72 |
| 2020/0153786 A1* | 5/2020 | Ward | ................... | H04L 61/6059 |
| 2020/0250184 A1* | 8/2020 | Frampton | ........... | H04L 63/1425 |
| 2021/0135989 A1* | 5/2021 | Ignatchenko | ....... | H04L 43/0864 |
| 2021/0160350 A1* | 5/2021 | Volpe | ................... | H04L 45/7453 |
| 2021/0184846 A1* | 6/2021 | Nix | ........................ | H04W 8/082 |
| 2021/0271423 A1* | 9/2021 | Foo | ........................ | G06F 3/0643 |

OTHER PUBLICATIONS

Minaburo, et al., "LPWAN Static Context Header Compression (SCHC) and fragmentation for IPv6 and UDP draft-ietf-lpwan-ipv6-static-context-hc-10", Feb. 28, 2018.

"Personal Stateful Firewall Administration Guide", Cisco ASR 5000 Personal Stateful Firewall Administration Guide, Text Part No. OL-24220-01, 2014.

* cited by examiner

METHOD AND APPARATUS PROCESSING OF MESSAGE DATA

CROSS-REFERENCE TO RELATED APPLICATIONS

This application is a National Stage of International patent application PCT/EP2019/056338, filed on Mar. 13, 2019, which claims priority to foreign European patent application No. EP 18305301.6, filed on Mar. 16, 2018, the disclosures of which are incorporated by reference in their entirety.

FIELD OF THE INVENTION

The present invention relates generally to the processing of data messages, and in particular the compression of such data.

BACKGROUND OF THE INVENTION

FIG. 1 shows schematically aspects of a network header compression mechanism as known in the prior art.

Specifically, FIG. 1 shows elements of a mechanism for header compression for IPv6 networks, substantially as proposed in LPWAN Static Context Header Compression (SCHC) for IPv6 and UDP draft-ietf-Ipwan-ipv6-static-context-hc-00

As shown, data are to be transmitted from a transmitting device A to a receiving device B via an IPv6 based LPWAN network 150. Due to limitations such as the power or bandwidth availability at the transmitting device, it may be desirable to reduce the total amount of data to be transmitted. In accordance with the mechanism of FIG. 1, a data packet comprising a number of defined fields for transmission is exposed to a set of Rules 110, 120, 130, 140, which together constitute a context 100*a*. Each Rule comprises a plurality of Field instruction lines. For example, the Rule 140 comprises Field instruction lines 141, 142, 143, 144, 145 etc. The Field Description lines have a common structure comprising four entries. Specifically, each Field Description line comprises a Field ID specifying one of the defined fields of the data packet, a Target Value, a Matching Operator and a Compression/decompression Action. Thus as shown, the Fields of Rule 141 can be seen as structured into four columns 140*a*, 140*b*, 140*c*, 140*d*. Accordingly, Field Description lines 141 has a Field ID 141*a*, a Target Value 141*b*, a Matching Operator 141*c* and a Compression/Decompression Action 141*d*. Similarly, Field Description lines 142 has a Field ID142*a*, a Target Value 142*b*, a Matching Operator 142*c* and a Compression/Decompression Action 142*d*.

In operation, a data packet processed at the transmitter side is compared successively to each Rule, and with each rule successively to each Field Description line of that Rule using a Matching Operator.

For each Field Description line it is determined whether the Target Value entry of the field referenced in the Field ID entry corresponds in a prescribed manner as defined in the Matching Operator entry of that Field Description line. In a case where referenced field corresponds to the Target Value in the prescribed manner for every fields in a respective rule, the Compression/Decompression Action of each field in the corresponding rule is applied.

The possible Matching operators include the operators "ignore" or "Equals" MSB(length) and Match-mapping from a list.

By way of example, Rule 140 might comprise the three fields shown below.

| FIG. reference | Field ID | Target Value | Matching Operator | Compression Function |
|---|---|---|---|---|
| 141 | F1 | 0x00 | Ignore | not-sent |
| 142 | F2 | 0x1230 | Equal | not-sent |
| 143 | F3 | 0xABC0 | Equal | not-sent |

On this basis, the first field in the data packet would be exposed first to Field instruction line 141, since the method of comparison prescribed in the Matching operator entry for this field is "Ignore", this comparison is automatically satisfied. The method then proceeds to Field instruction line 142, for which the manner of comparison prescribed in the Matching operator entry is "Equal". Accordingly, the field F2 of the data packet must comprise the Target value "0x1230", as defined in the Target Value Field. The method then proceeds to Field instruction line 143, for which the manner of comparison prescribed in the Matching operator entry is "Equal". Accordingly, the field F3 of the data packet must comprise the Target value "0xABC0", as defined in the Target Value Field.

Assuming all three Fields in rule 140 are satisfied on this basis, Rule 140 is selected for application. On this basis, the compression instruction of each field in the rule 140 is applied to the data packet.

As shown above, the compression function for all three Field instruction lines of rule 141 is "not sent", indicating that each of the three fields in question F1, F2 and F3 is stripped from the packet to be transmitted.

As shown in FIG. 1 the compressed packet is then transmitted via the network 150 to the receiving side b, together with an identifier of the Rule 140 that has been applied, ID4.

As shown, a set of Rules 160, 170, 180, 190, corresponding to rules 110, 120, 130 140 as described above respectively together constitute a context 100*b*. The context 100*b* corresponds in structure and content to context 100*a*, so that each Rule comprises a plurality of Field instruction lines. For example, the Rule 190 comprises Field instruction lines 191, 192, 193, 194, 195 etc. The Field instruction lines have a common structure comprising four entries. Specifically, each Field instruction line comprises a Field Reference specifying one of the defined fields of the data packet, a Target Value, a Matching Operator and a Compression/decompression Action. Thus as shown, the Field instruction lines of Rule 191 can be seen as structured into four columns 190*a*, 190*b*, 190*c*, 190*d*. Accordingly, Field instruction line 191 has a Field Reference 191*a*, a Target Value 191*b*, a Matching Parameter 191*c* and a Compression function 191*d*. Similarly, Field instruction lines 192 has a Field Reference 192*a*, a Target Value 192*b*, a Matching Parameter 192*c* and a Compression function 192*d*.

In operation, the received data packet is processed in accordance with the rule specified by the received transmission, that is, Rule ID4, corresponding to Rule 190. Each Field instruction line in the specified rule is applied to the respective field in the prescribed manner.

With reference to a Rule 190 that is identical to rule 140 as presented above, as indicated by the unique rule ID, ID4, the Rule 190 might comprise the three fields shown below.

| FIG. reference | Field Reference | Target Value | Matching Operator | Compression Function |
|---|---|---|---|---|
| 141 | F1 | 0x00 | Ignore | not-sent |
| 142 | F2 | 0x1230 | Equal | not-sent |
| 143 | F3 | 0xABC0 | Equal | not-sent |

On this basis, the first field F1 in the data packet would be filled with the value 0x00, the second field F2 in the data packet would be filled with the value 0x1230 and the third field F3 in the data packet would be filled with the value 0xABC0.

It may be observed on this basis that the resulting packet 13 is identical to the original packet 11, apart from the value of Field F1, where the original value 0xA1 has been replaced by the value 0x00, by the operation of the "ignore" Matching operator in field 141c. It will be appreciated that in certain cases it may be determined that the value of a particular field can safely default to a predetermined value in this way without interfering with overall system operation. Compression/Decompression operations defined in the standard mentioned above include the following.

| Function | Compression | Decompression |
|---|---|---|
| not-sent | elided | use value stored in Target Value of the instruction line |
| value-sent | send | build from received value |
| LSB(length) | send LSB | use value stored in Target Value of the instruction line value OR received value |
| compute-IPv6-length | elided | compute IPv6 length |
| compute-UDP-length | elided | compute UDP length |
| compute-UDP-checksum | elided | compute UDP checksum |
| ESiid-DID | elided | build IID from L2 ES address |
| LAiid-DID | elided | build IID from L2 LA address |

Mechanisms such as that described with reference to FIG. 1 provide a basis for reducing the data flow in networks, nevertheless as the number of devices using such communications systems grows, and the capacities of end devices are subject to ever stricter limitations in terms of power consumption, processing power and communications bandwidth, it is desirable to provide mechanisms for further optimizing such communications.

SUMMARY OF THE INVENTION

In accordance with the present invention in a first aspect there is provided a method of processing a data message for transmission. The method comprises the steps of parsing a field of the data message for a data component of a first type, where the data component of the first type is derivable from a data source other than a data stream associated with the data message, adding a marker to the data message, the marker being associated with a specification of a processing operation defining the derivation.

In accordance with a development of the first aspect the step of adding a marker associated with the first data component type to the data message comprises replacing the data component with the marker.

In accordance with a development of the first aspect the method comprising the steps of extracting a marker associated with a first data component type from the data message, and deriving a further data component by means of a processing operation with respect to a data source other than a data stream associated with the data message, where the processing operation is defined in a specification associated with the marker.

In accordance with a development of the first aspect the method comprises the further step of reconstituting the data component with the further data component.

In accordance with a development of the first aspect the method comprises the further step of adding the further data component to the data message.

In accordance with a development of the first aspect the method comprises the further step of storing the further data component, and in a further iteration of the step of parsing a region of a further data message for a marker associated with a first data component type, retrieving the stored substitute data instead of repeating the step of interrogating a data source associated with the marker.

In accordance with a development of the first aspect the data source is a DNS server and wherein the marker indicates the data source and an URL, and wherein the substitute data is an IP address.

In accordance with a development of the first aspect the data source is a DHCP server and wherein the specification indicates the data source and an MAC address and wherein the further data component is an IP address.

In accordance with a development of the first aspect the data source is an encryption key server adapted to return an encryption key of a specified entity, and wherein the specification indicates the data source and the specified entity.

In accordance with a development of the first aspect the marker further comprises an encrypted version of the data component, the method comprising the further step of using the retrieved encryption key to decrypt the encrypted version of the data component.

In accordance with a development of the first aspect the data component is a fragmentation checksum, and wherein the source is a checksum calculator adapted to return a corresponding checksum.

In accordance with a development of the first aspect there are defined a one or more rules, each rule comprising one or more field instruction lines, each field instruction line comprising a target value and a processing instruction;

the method comprising the further steps of determining for a rule whether a respective specified region of the data message corresponds to the target value in a respective prescribed manner, and in a case where the respective specified region corresponds to the target value in the respective prescribed manner for each field instruction line in a respective rule, applying the processing instruction of each field instruction line in the corresponding rule with regard to the respective specified region, wherein the data component processed as defined by the processing instruction.

In accordance with the present invention in a second aspect there is provided computer program comprising instructions adapted to implement the steps of the first aspect.

In accordance with the present invention in a third aspect there is provided transmission processor for processing a data message, the transmission processor being adapted to parsing a field of the data message for a data component of a first type, where the data component of the first type is derivable from a data source other than a data stream associated with the data message, and to adding a marker to the data message, the marker being associated with a specification of a processing operation defining the derivation.

In accordance with the present invention in a fourth aspect there is provided reception processor for processing a received data message, the reception processor being adapted to extract a marker associated with a first data component type from the data message, and to derive a further data component by means of a processing operation with respect to a data source other than a data stream associated with the data message, where the processing operation is defined in a specification associated with the marker.

BRIEF DESCRIPTION OF THE DRAWINGS

The above and other advantages of the present invention will now be described with reference to the accompanying drawings, for illustration purposes only, in which.

DETAILED DESCRIPTION

Figure 2:
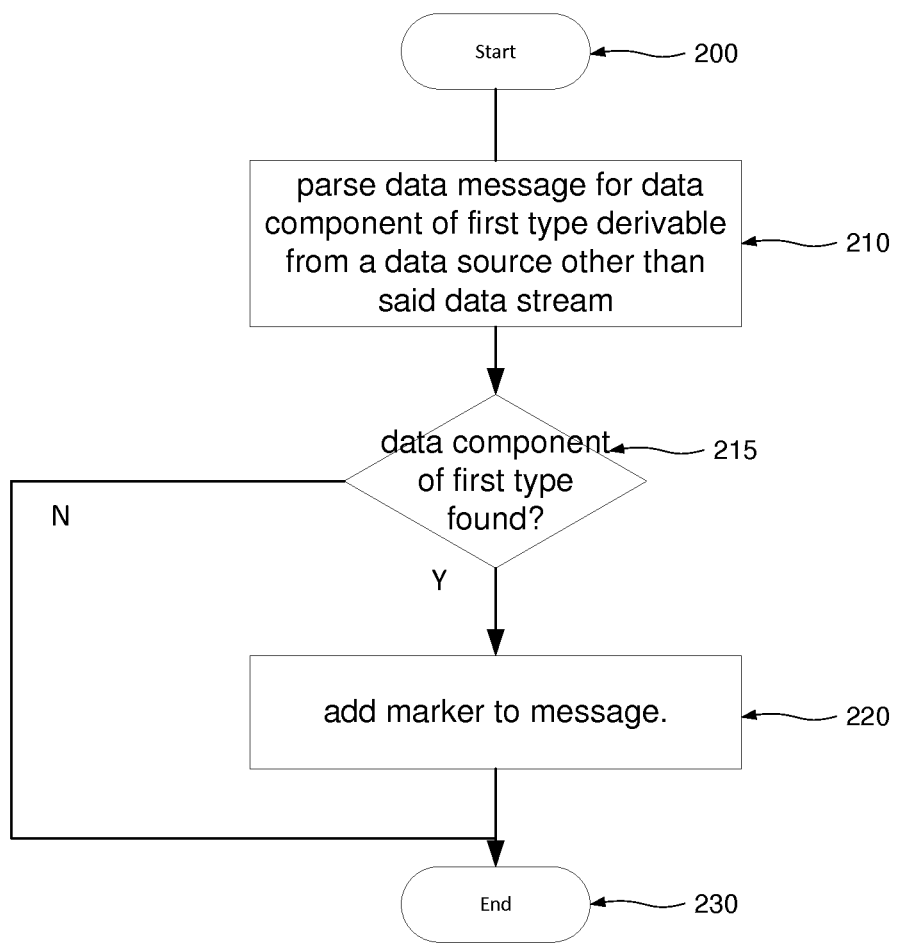
FIG. 2 shows a method according to a first embodiment.

FIG. 2 shows a method according to a first embodiment.

As shown in FIG. 2, there is provided a method of processing a data message for transmission. The message may be a packet, for example defined in accordance with a known packet transmission protocol such as IPv6 or IPv4. The message may equally constitute a burst type message, for example in a point to point communication. By way of the example, the message may comprise a communication with weather station reporting communications, cellular telephone signalling communications such as 3G PDU, Mobility Management, and the like, Bluetooth, Zigbee, ADS-B aircraft communications, remote industrial sensors such as flow control and status monitoring of pipelines, intrusion detection of remote installations, Device Management (such as OMA-DM, LWM2M), OneM2M, OCF, Thread, ZigBee Cluster Library, and so on.

In some embodiments the data component may be obtained with reference to a characteristic of the data message or a data stream to which the data message may belong. It will also be appreciated that some or all aspects of the characteristic may be obtained dynamically, for example at system initialization or when the specification is processed. For example, where an aspect of the message is the originating IP address, this may be obtained at the transmission side at system start up.

This characteristic may be any characteristic of a data stream to which the message belongs or is otherwise associated which may be assumed to remain true as the stream is passed through the network. Possible examples of the characteristic may include the protocol according to which the message is encoded, for example, IPv4 or IPv6. Deductions can be made from the characteristic about the form and content of the stream, which may underlie some of the processing operations described in more detail hereafter. It will be appreciated that embodiments may be used in a very wide range of communications networks, including by way of non limiting example, IPv4 or IPv6, CoAP (Constrained Application Protocol), UDP (User Datagram Protocol), TCP (Transmission Control Protocol), ICMP (Internet Control Message Protocol), ICMPv6, CBOR (Concise Binary Object Representation), CoMI (CoAP Management Interface), LWM2M (Light Weight Machine to Machine), OneM2M, OCF (Open Connectivity Foundation), MQTT (Message Queuing Telemetry Transport), RoHC (Robust Header Compression), VJ (Van Jacobson Header Compression), GHC (Generic Header Compression), DTLS (Datagram Transport Layer Security) or other features characteristic of any of the communications contexts mentioned above, non-formatted data messages where individual data fields are attributed to fixed bit or word positions within a message which may have a proprietary format, or otherwise.

The method as shown begins at step 200 before proceeding to step 210 at which a field of the data message is parsed for a data component of a first type, where substitute data corresponding to the data component of the first type is derivable from a data source other than a data stream associated with the data message in combination with knowledge of the characteristic.

On the basis of the compression technique described with reference to FIG. 1, the data component may be a field of the data message, for example as specified in the Field ID entry of a field instruction line. On this basis, the parsing of the data component may comprise the step of determining whether the specified field corresponds to the target value in the manner defined by the matching operator of the field instruction line. The skilled person will appreciate that in different contexts, the parsing of the data message may be performed by any suitable mechanism.

Determining whether the specified field corresponds to the target value in the manner defined by the matching operator of the field instruction line does not necessarily constitute determining whether the field is equal to the Target Value. The Matching Operator may be used to evaluate if the field value matches the Target Value. This may be expressed as: MO(Field_Value, Target_Value)— where MO returns TRUE or FALSE (match or no match). This representation is denoted as the Polish notation. Where the data component of the first type is thus identified, as determined at step 215, the method proceeds to step 220 at which a marker associated with a specification of a processing operation defining the derivation of the substitute data is added to the data message before terminating at step 230. Otherwise where the data component of the first type is not identified, as determined at step 215, the method terminates at step 230.

In embodiments for example as discussed hereafter, the modification of the data message with a marker may be performed with a view to compressing or enriching the data message. The definition, selection or inclusion of the marker may be carried in accordance with an instruction provided in the Field Instruction Line, in particular in the Processing Operation Field, or otherwise, as discussed in more detail below. The marker may comprise a Rule ID, for example as described with respect to FIG. 1, or hereafter, in which case the specification of a processing operation defining the derivation of the substitute data may correspond to a rule, or an instruction line of a rule. This process does not imply a constraint on the nature of the marker—it could be an opaque set of bits (e.g. a label) or structured information (e.g. CBOR-, XML- or otherwise formatted data).

It may be noted that while the Compression/Decompression operations of the prior art rely solely on characteristics of the data message itself, or of the data stream to which it belongs and as such are inherently static, embodiments described herein enhance this approach with a dynamic determination of data components.

On this basis, in a compression mode the step of modifying the data message with the marker may comprise replacing the data component with the marker. By way of example, the Marker may comprise a Rule ID as discussed with reference to FIG. 1, where substitute data corresponding to the data component is derivable from a data source other than other than a data stream associated with the data message.

Similarly, in an enriching mode the step of modifying the data message with the marker may comprise replacing the data component with the marker. By way of example, the Marker may comprise a Rule ID as discussed with reference to FIG. 1, where substitute data corresponding to the data component is derivable from a data source other than a data stream associated with the data message.

Figure 3:
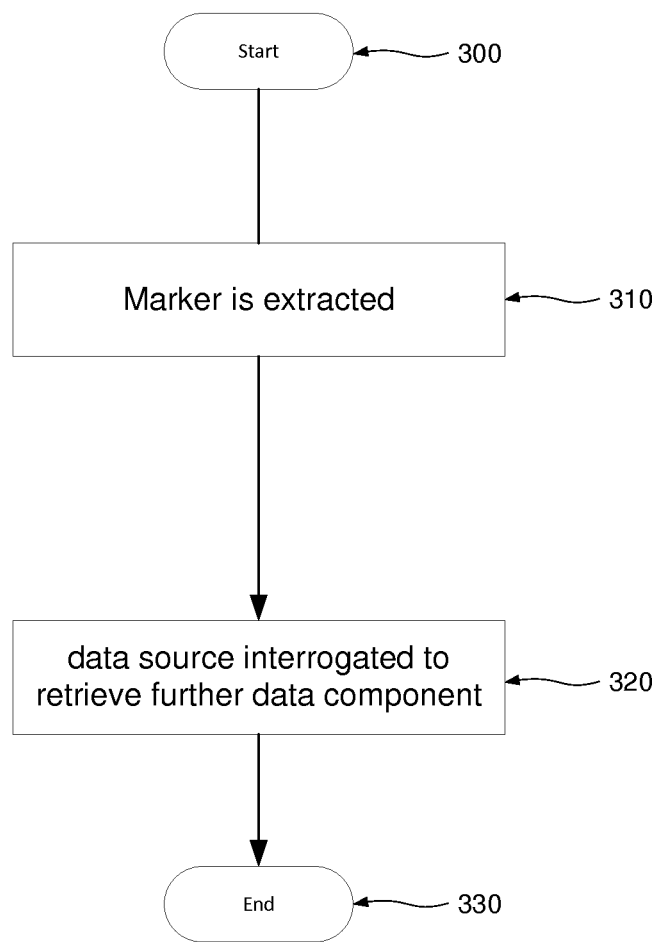
FIG. 3 shows a method according to a second embodiment.

FIG. 3 shows a method according to a second embodiment.

As shown in FIG. 3, there is provided a method of processing a received data message.

As such, the method of FIG. 3 may be seen as implementing the matching process to that described with reference to FIG. 2, with the method of FIG. 2 being implemented at a sender or transmitter, and the method of FIG. 3 being implemented at a receiver, receiving, for example, messages processed in accordance with the method of FIG. 2.

As shown in FIG. 3, the method starts at step 300 before proceeding to step 310 at which a marker associated with a first data component type of the data message is extracted. The method then proceeds to step 320 at which a further data component is derived by means of a processing operation with respect to a data source other than a data stream associated with the data message, where the processing operation is defined in a specification associated with the marker The method then terminates at step 330.

Figure 4:
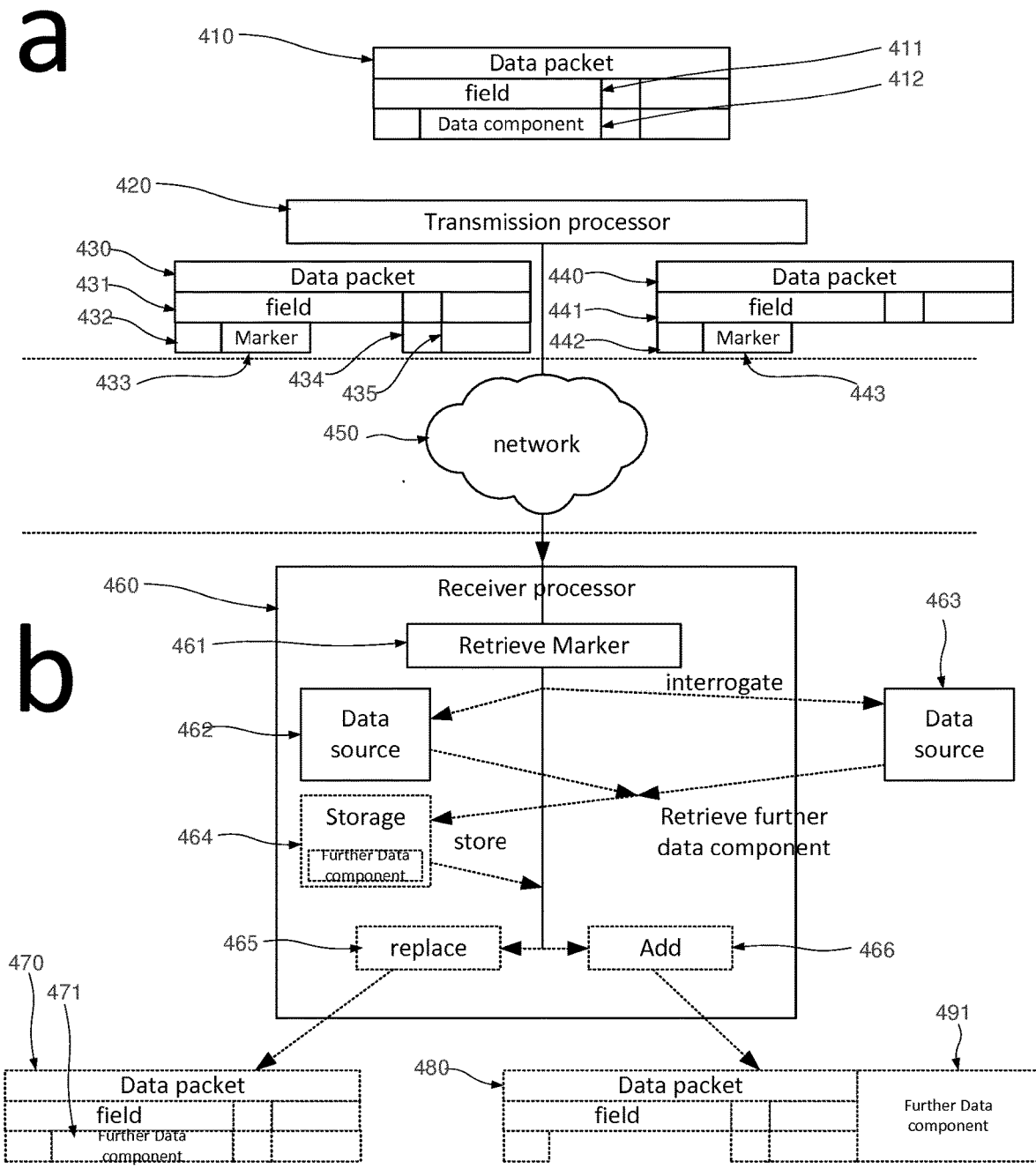
FIG. 4 presents schematically the combined operations of the methods of FIGS. 2 and 3 in accordance with certain embodiments.
Figure 5:
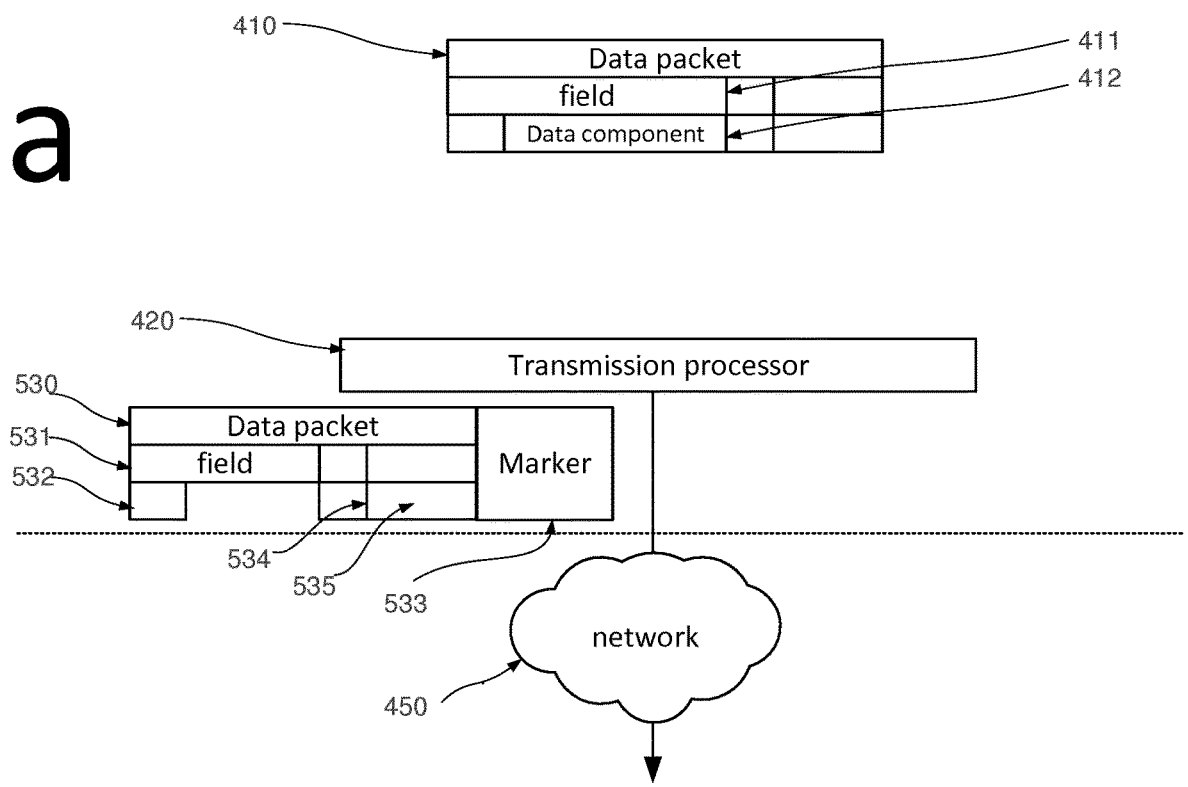
FIG. 5 shows a variant of transmission side processing as introduced with regard to FIG. 4.

FIG. 4 presents schematically the combined operations of the methods of FIGS. 2 and 3 in accordance with certain embodiments.

As shown in FIG. 4, a data message 410 is processed for transmission at transmission processor 420. In accordance with the method of FIG. 2, a field 411 of the data message 410 is parsed for a data component of a first type 412, where the data component of the first type 412 is determined to be derivable from a data source other than a data stream associated with the data message 410. The transmission processor then replaces the data component 412 with a marker 433, 443 associated with the first data component type. As shown, the marker 433 may replace merely the data component in question, or alternatively a single marker 443 may replace data components belonging to a number of fields in the data message, for example as allowed by the approach described above with respect to FIG. 1. It will be appreciated that the term "replacing" should not be understood to require that the marker be placed in the same position in the data message as the data component, or that it should have the same length. Indeed the marker will typically be much shorter that the data component it replaces so as to achieve a compression effect. Indeed where the marker takes the form of a Rule ID along the lines of the approach described with reference to FIG. 1, it may typically be in the order of 1 byte, and may be as small as one bit. It will be appreciated that one or more markers may be used to replace data components belonging to the same field, or belonging to different respective fields, or spread across a plurality of respective fields. It will be appreciated that in certain cases the field or fields containing data components that are to be replaced by one or more markers may contain additional content that is not replaced by a marker, in which case this further content is included in the data message 430, 440 as a respective residual payload 432, 442.

The resulting data message 430 or 440 is then transmitted via the network 450 from the sender a to the receiver b. In certain implementations communications in accordance with embodiments may occur between an end device, and a server or other centralized point. In any case, where communications occur between two devices in accordance with embodiments, they may each operate as a sender and a receiver. In other cases, a particular device may operate only as a sender, or only as a receiver.

When the receiver b receives the data message 430 or 440, it is processed by a receiver processor 460 and the marker 433, 443 is extracted by functional unit 461 from an internal data source 462, or external data source 463, to a further data component.

The data source may be a Database—in memory or on storage, Blockchain, Public registries, such as ones held by IANA, a file for example in XML, JSON, or binary format, or otherwise. Further examples are provided below.

Figure 1:
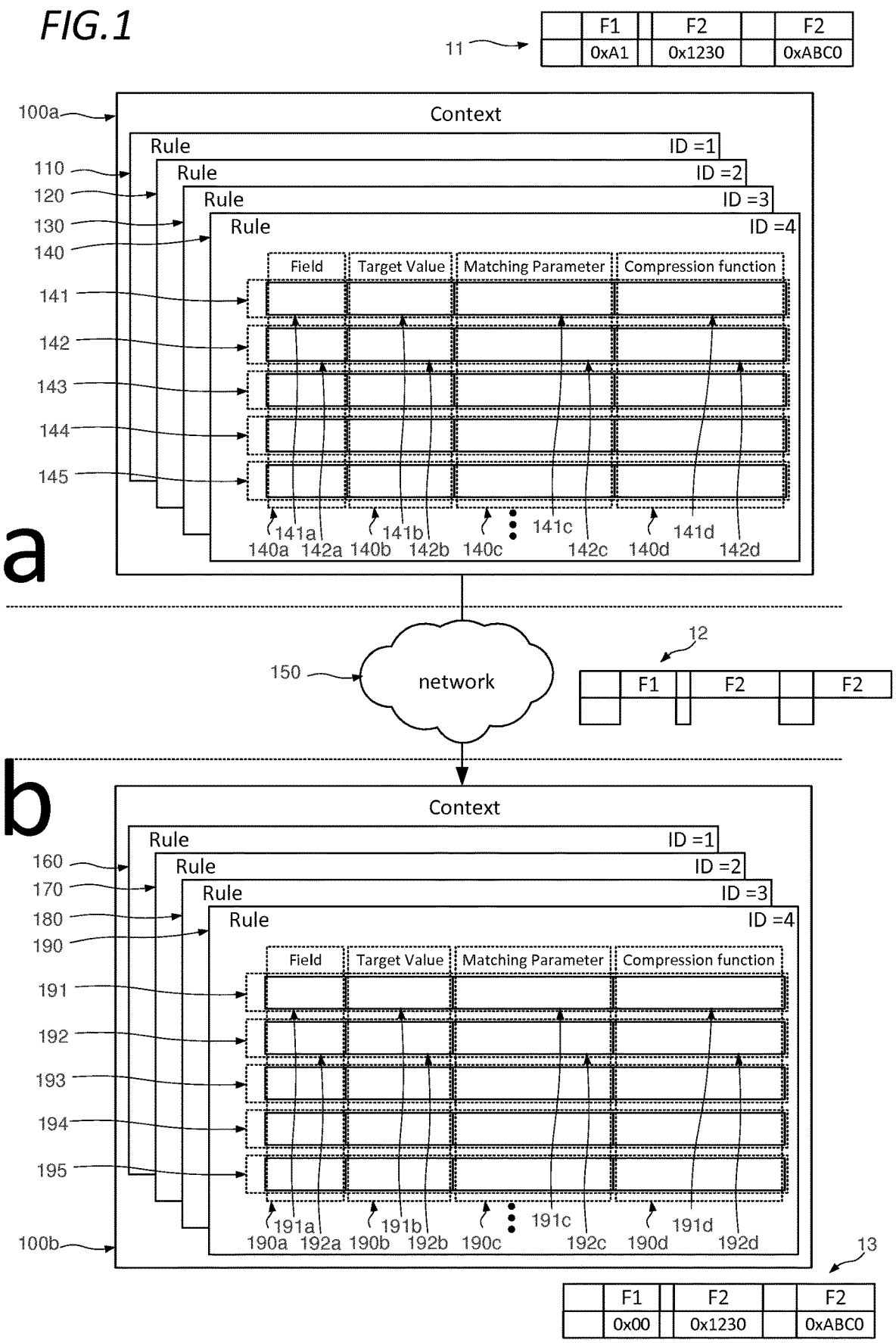
FIG. 1 shows schematically aspects of a network header compression mechanism.

In the arrangement of FIG. 1, it is presumed that the Specifications are identical in the receiver and transmitter, and by the same token that they are identical regardless of the characteristics of where they are implemented, for example in an end device on one hand or a server on the other. For example, for compression the IP address might be compressed regarding values learned either through DHCP (global) or SLAAC (link local), so that the marker will indicate if is a global or link local address. At the receiver side however it may be sufficient to decompress the address with a generic vale knowing the nature of the address where of the real value of the address. In accordance with certain embodiments, alternatives may be envisaged, for example as follows:

Specifications defining a processing operation may be defined in which certain elements present alternatives, for application depending on the situation—for example, different target values, matching operators or processing instructions for received messages as opposed to transmitted messages, etc.

The transmission processor or receiver processor may be adapted to process Specifications defining a processing operation in a manner corresponding to the situation of the device in which it operates. For example, where a specification calls for a DHCP operation, in the case of a transmission from the device itself the transmission processor may be programmed to omit this step and simply insert a predefined value for the devices IP address.

In accordance with certain optional variants, the further data component may be stored in a storage device 464, for example to reduce the need for further interrogation actions.

On this basis, embodiments may be seen as association of a state with a given device, data flow, message, or generally the compressor/decompressor. A specific example would be the notion that a device may have the same IPv6 address during it's association to a particular network, the management application on this device will have the same UDP port for the entire lifespan of the device, a specific management session (which would reconfigure the period of device sleeping) may have a CoAP Token ID valid for the duration of the management session, the compressor/decompressor may have a specific Processing Instruction function implemented or absent, etc. On this basis, for example, if the Target Value entry implements a learning operation as described in more detail below, the learning must be stored somewhere. This may be on an external service (e.g. pushing it via HTTPS or storing it in a Database), or otherwise, but in any case essentially constitutes the keeping of a state. The same thing goes for any function that may be changed, discovered, learned, or used internally. There may be a function keeping the number of messages that have passed through the compressor. Or, there may be the FEC function that could be storing specific messages for recovery. Or, the keys of encryption, or tunnel establishment, or signature. Once communications are seen to have a stately aspect, a signalling mechanism allowing the two devices in communication to exchange data relative to their operation or to a particular state becomes meaningful. This could be then used for conveying values from the functions, which might need to be configured when the functions are executed. Such a state may retained on a per compressor/decompressor basis, per data flow, per device, per specification, per context, per function, or created dynamically. The state may be kept locally, remotely (e.g. via SSH, DNS, DHCP, HTTPS, MQTT, ODBC), or both. The context may then be seen as a static description, which has indications on how to interact with the state. Embodiments relate to a marker associated with a specification of a processing operation defining the derivation of a data component from a data source other than a data stream associated with the data message. The processing operation may comprise an instruction to retrieve the data component, or some precursor thereto, from a repository such as a static file or database. The processing operation may alternatively or additionally comprise an instruction to retrieve the data component, or some precursor thereto, from a process, which may be an external application, or a software operation defined in the specification itself, and executed on a suitable platform, in which case the executed software may constitute the data source. In either case, the data source is not the data stream associated with the data message, for example a data stream to which the data message belongs, or the data message itself. The data source may optionally exclude the specification, and/or a context to which the specification belongs. The processing operation may contribute to the definition of the respective specified region, the target value, the prescribed manner in which the target value and the value in the specific region may be required to correspond, or the processing instruction to be performed in a case where the field instruction line is applied at step 235, or any combination or some or all of these.

As such there is disclosed a transmission processor for processing a data message, the transmission processor being adapted to parsing a field of the data message for a data component of a first type, where the data component of the first type is derivable from a data source other than a data stream associated with the data message, and to adding a marker to the data message, the marker being associated with a specification of a processing operation defining the derivation.

Similarly there is disclosed reception processor for processing a received data message, the reception processor being adapted to extract a marker associated with a first data component type from the data message, and to derive a further data component by means of a processing operation with respect to a data source other than a data stream associated with the data message, where the processing operation is defined in a specification associated with the marker.

The marker is associated with a specification of a processing operation defining the derivation of the data component. The marker may designate a specification by reference or in any convenient manner. An example of a specification is a Rule as described above, in which context a marker may be a Rule ID. In certain embodiment, the marker may comprise additional information, for example a compression residue, learning information, or signal/control information as discussed below.

In certain embodiments a Marker may convey state information for the Compressor/Decompressor in band. For example, a Field with a function may have a Structured Variable Length Marker (SVLM). This SVLM may have a structure, e.g. expressed in CBOR, as a TLV or other. This may spit the Marker in two parts—"Marker" and "Additional information". The "Additional information" may carry information such as "New Target Value" for the Target Value. In the example of DHCP( ) server below, the Network may perform a DHCP to determine the IP address, then send the obtained value in a SLVM to the Device.

This could then also be used to initialise the configuration of a device through a single specification defining a processing operation allocated for this use, e.g. a specification defining a processing operation which contains all functions that need a value. The Specifications defining a processing operation itself will not generate any packets or operations on the device other than the setting up of the state associated with these functions.

An example of this could be asking the user to define some values, e.g. Source IP, Destination IP, UDP Destination on the end-device. This could be expressed for example with the definition of a function:

UserDefined( )

The device can then have a CONFIG SPECIFICATION, with RULE_ID=100, might be by way of example:

| Field Reference | Target Value | Matching Operator | Processing Instruction |
|---|---|---|---|
| ConfigProtocol.Any | UserDefined('FirstIPv6Add') | ignore | sent |
| ConfigProtocol.Any | UserDefined('SecondIPv6Add') | ignore | sent |
| ConfigProtocol.Any | UserDefined('FirstUDPDest') | ignore | sent |

Here, the variables "FirstIPv6Add", "SecondIPv6Add" and "FirstUDPDest" make reference to part of the local state on the end-point. This could then be referenced by functions in other specifications defining a processing operation, e.g. to act as TargetValue. The naming is user-defined, and can have logic such as "All.IPv6.source" or "RuleID.5.IPv6.source" for example.

This specification defining a processing operation will be matched only when a configuration needs to be sent, and can use the SVLM. (alternatively, there could be a Management protocol that could perform this configuration on top of CoAP or other means not understood directly by the transmission processor/reception processor. The SVLM provides a way to synchronize the states of the two communicating ends in band.

The "Additional Information" may also include indication that the sender does not have the field in its state. This indicates to the receiver that they need to send it whenever possible. For example, a device may see the DHCP( )function in the context, but may NOT be capable of executing directly the DHCP( ) Upon compression, it would indicate in the "Additional information" part of the SVLM "Missing local state".

In accordance with certain optional variants, the further data component may be subjected to further processing in the receiver processor or the transmission processor.

In accordance with certain optional variants, the further data component 471 may take the place of the original data component 412 in a reconstituted, or decompressed Data message 470, for example through a replace functional unit 465.

In accordance with certain optional variants, the further data component 491 may be added e.g. by an "add" functional unit 466 to the data message as a further field not belonging to the original, or reconstituted data message 480

The method of FIG. 2 or 3 may be implemented in a scenario such as that of FIG. 1 in which there are defined a one or more rules, each rule comprising one or more instruction lines, each instruction lines comprising a target value and a processing instruction. As such, "Rules" of this kind are example of specifications defining a processing operation. In such a context, the method may comprise the further steps of determining for a rule whether a respective specified region of the data message corresponds to the respective target value in a respective prescribed manner, and in a case where the respective specified region corresponds to target value in the respective prescribed manner for each field in a respective rule, applying the processing instruction of each field in the corresponding rule with regard to the respective specified region. The general structure described with respect to FIG. 1 is one example of such an operational scenario, although the skilled person will appreciate that any number of variants of such a scenario may be envisaged. Although certain examples herein are described with reference to scenarios of this kind, it will be appreciated that embodiments are applicable to many message processing and header compression scenarios. For example, the message may be a packet, for example defined in accordance with a known packet transmission protocol such as IPv6 or IPv4 and eventually upper layered protocol. The message may equally constitute a burst type message, for example in a point to point communication. By way of the example, the message may comprise a communication with weather station reporting communications, cellular telephone signalling communications such as 3G PDU, Mobility Management, and the like, Bluetooth, Zigbee, ADS-B aircraft communications, remote industrial sensors such as flow control and status monitoring of pipelines, intrusion detection of remote installations and so on as mentioned above.

A basic approach along the lines of FIG. 1 may be extended in a number of ways to increase its power and sophistication.

The general approach of testing each rule, and then applying each Field instruction line in the rule means that operations can be included in the rule written in such a way that they have no effect on the testing (they are always true) for example by setting the Matching Operator to Ignore, but then including particular operations for the further processing of the data message. A number of examples presented below make use of this approach.

In some cases, it may be presumed that the Field instruction lines of the selected rule are applied in the order that they appear in the rule, and that the output data message is constructed from end to end in the same sequence as the order of Field instruction lines in the Rule being applied. By this means, the output data message can be structured by properly defining the sequence of Field instruction lines, and the Field ID number can in some cases be used for other purposes. A number of examples presented below make use of this approach.

In accordance with certain embodiments, Field instruction lines may be executed in an arbitrary sequence as suggested by some additional consideration. For example, Field instruction lines may be associated with a sequence number, or certain Field ID lines not corresponding to real fields of the data packet may be processed in a predefined order of precedence, or otherwise. It will be appreciated that certain Field instruction lines might continue to be executed in order of their position in the header, whilst others are treated in some other sequence.

The Processing instruction may comprise a Compression and/or Decompression action as discussed with respect to FIG. 1. As well as performing a variety of additional operations with the Processing instruction, we can also define functions that provide a zero-length output (e.g. output nothing) and only focus on the Action.

The further data component retrieved in accordance with the method of FIG. 3 may then be used in a variety of manners.

In some cases, the further data component may be used to populate a decompressed data message by filling empty sections of the data message with the retrieved information. On this basis, the operation of the methods of FIGS. 2 and 3 taken together constitute an end to end compression/decompression operation. As such the method may comprise the further step of replacing the data component with the further data component.

In some cases, the further data component may be used to enrich a data message by adding the retrieved information as complementary data in the data message, in addition to the original data message. On this basis, the operation of the methods of FIGS. 2 and 3 taken together constitute an end-loaded enrichment operation. As such the method may comprise the further step of adding the further data component to the data stream.

In some cases, the method may comprise the further steps of storing the further data component, and in a further iteration of the step of parsing a region of a further data message for a marker associated with a first data component type, retrieving the stored substitute data instead of repeating the step of interrogating a data source associated with the marker.

It will be appreciated the various use cases mentioned above may be combined. For example, the further data may be both added to the data stream, and stored for future iterations, it may be used to decompress the data message, and stored for future iterations, or any other combination.

It will be appreciated that in such a context, the retrieval and as the case may be the use of the further data component may be performed at various different points in the process. For example, the data source may be interrogated in the context of the specification of the field, the definition or resolution of the processing instruction, the definition of the manner in which a particular target value is required to correspond to the target value, the definition of the target value, and so on. In the following sections, some of these possibilities are explored in further detail.

In certain embodiments, the deriving of a further data component by means of a processing operation may be implemented by means of a special processing operation commands incorporated in the specification, which the transmitting or receiving processor is adapted to interpret and execute directly in order to generate the further data component or an element thereof. There may be provided a plurality of such special processing operation commands, each corresponding to a particular function, or one or more general special processing operation commands, whose function is interpreted on the basis of other elements in the same field instruction line. By way of example, the following examples of "generate" or "compute" functions follow this latter approach, although the skilled person will appreciate that they might equally be implemented individually.

The following three examples show the use of a "generate" processing instruction in accordance with embodiments. Such a "generate" processing instruction can be used to fill a field that is not sent over the network, meaning that in some cases the field in question can simply be elided in the transmitted data. The "generate" processing instruction may be associated with use of storage such as element 464 as described above to allow operations to be spread across a plurality of subsequent messages. For the IPv6 Flow Label field id in the IPv6 header

| Field Reference | Target Value | Matching Operator | Processing Instruction |
|---|---|---|---|
| IPv6.FlowL | | ignore | generate |

When the data message containing a data component corresponding to the device address arrives at the transmitter processor, the transmitter processor determines the specification to be applicable, since in any case the matching operator is "ignore" so the line will always hold true, and on this basis executes the "generate" operation whereby the same identifier value is generated for all messages having the same source address, source port, and destination port. The generate operation may be defined to store the label, and then discard it after a certain period of time depending of the traffic characteristic.

While the example presented above retains the four column structure of the approach of FIG. 1, it will be appreciated that additional columns may be defined, supporting additional parallel functionality, and/or extending or modifying behaviours in accordance with embodiments of the invention. For example, in addition to specifying a field as defined in the underlying protocol of the data message, a sub part of a field may be defined in terms of for example of a starting position within the specified field and a sub-field length, or otherwise. While the approach of FIG. 1 assumes that Specifications are equally applicable upstream and downstream, specifications may also be defined that are applicable in one direction or the other, or are applicable in one way in one direction, and another in the opposite direction, or otherwise. Additional fields may also be added to the context table which may be either optional for system housekeeping, such as a specification expiry date (for sun setting a data format, or for subscription expiry, say) This is equivalent to adding a date operator in the matching operator, but may be conceptually easier to manage as an additional field in the implementation of the context database. Other examples may include specification validity window (2 fields), logging ID (maybe for performance analysis—1 field) etc . . .

For the sake of clarity, Field ID references which correspond to a real specified field in the data message are defined in the specification table above, and those of further examples below in accordance with the convention [Protocol]. [Field reference]. Field ID references not complying with this convention, and in particular presenting a first component not corresponding to a network protocol may be understood to make alternative use of the Field ID, in order to implement special features as described herein.

For IPv4 fragmentation identifier field id of the IPv4 header.

| Field Reference | Target Value | Matching Operator | Processing Instruction |
|---|---|---|---|
| IPv4.fragId | | Ignore | generate |

When the data message containing a data component corresponding to the device address arrives at the transmitter processor, the transmitter processor determines the specification to be applicable, since in any case the matching operator is "ignore" so the line will always hold true, and on this basis executes the "generate" operation whereby the following field instruction line may generate a different value each time the Processing Instruction is called. The value can be different for all messages or for each tuple composed of the same source address, same source port, and same destination port for example.

For a CoAP Message ID field id of the CoAP header.

| Field Reference | Target Value | Matching Operator | Processing Instruction |
|---|---|---|---|
| CoAP.MID | | ignore | generate |

When the data message containing a data component corresponding to the device address arrives at the transmitter processor, the transmitter processor determines the specification to be applicable, since in any case the matching operator is "ignore" so the line will always hold true, and on this basis executes the "generate" operation whereby for a CoAP Message ID the behaviour may be the same as for IPv4 fragmentation—a "generate" processing instruction as shown by way of example in the following field instruction line may generate a different value each time the Processing Instruction is called. The value can be different for all messages or for each tuple composed of the same source address, same source port, and same destination port for example. It can be used for the compression of NON-messages.

In particular, the data component may be a fragmentation ID, and the source may be a checksum calculator adapted to return a corresponding ID.

For example in IPv4, the identifier for fragmentation can be generated by the decompressor and must be different for each packet, in IPv6, the flow label can be generated by the decompressor but must be kept equal for a flow. For CoAP Message ID we have the same behaviour as for IPv4 fragmentation id.

Use of the Further Data Component in the Context of the Target Value.

If it is assumed that a sender such as an end user device has implemented the method of FIG. 2 so as to transmit a Marker corresponding to a Rule ID specifying the specification below, Protocol.fieldID is a general name to call the specific field to be learned.

| Field Reference | Target Value | Matching Operator | Processing Instruction |
| --- | --- | --- | --- |
| Protocol.field ID | Learning1(val, . . .) | Equal | not-sent |

The target value is configured by means of a function, which may optionally have some parameters. This function returns a value used as a target value for example in a process as described with reference to FIG. 1, or otherwise.

If the function is present in a number of different Field instruction line then the result can be cached the first time the services is called, in which case it may then be called again from time to time to refresh the value, or it may simply be called for each Field instruction line.

On this basis, when it is determined whether a respective specified region of the data message corresponds to the respective target value in a respective prescribed manner, the target value in question is retrieved on the fly from a service designated in the specification.

In some cases it may also be desirable to inform the end device of the obtained value. This may be done for example using a management protocol (such as Lightweight M2M, CoMI or other), through a signalling protocol (such as MAC-layer commands), specially allocated RuleIDs, etc.

As one example of the use of the general approach described above to define the target value, the target value may comprise a marker defined so as to retrieve a device address.

The following entries illustrate how an IPv6 address may be obtained dynamically for a device in accordance with an embodiment using DHCP

| Field Reference | Target Value | Matching Operator | Processing Instruction |
| --- | --- | --- | --- |
| IPv6.prefES | DHCP("node1") | Equal | not-sent |
| IPv6.IIDES | DHCP("node1") | Equal | not-sent |

When the data message containing a data component corresponding to the device address arrives at the transmitter processor, the transmitter processor determines the specification to be applicable for example by populating the target value by performing a DHCP call as specified in the specification, comparing this to the Sender address field as specified in the field reference, and assuming this matches finding the specification to be applicable, and in view of the "not sent" operation elides the address._. When the data message arrives at the receiver processor, the marker is extracted, and in response, the specification set out above is applied to the data message and new DHCP operation is performed to obtain the sender's IP address and incorporated in the a reconstituted data message.

This functionality provides an example of a case where it may be desirable to additionally store the result of the operation—the first time a message is sent from this device, the processor may send a DHCP request, asking for allocation of an IP address for this device as described above. The answer will then be stored in the state associated with this device. From here on, any uplink or downlink message (to/from device) may use this IP address.

This functionality provides an example of a case where it may be desirable to additionally modify the specification itself: the processor may change permanently the specification by replacing the DHCP(«node1») text with a constant value e.g. «2001::1» or «10.0.0.1».

Still further, this example may be suitable for embodiments implementing aspects of a state communications, and raises considerations where operations may be performed differently depending on the role of the device performing the operation, for example in the case of end devices on one hand, and network components on the other. In the presence of a configuration protocol (signalling/control or in-band), if the network side is the sender, it may determine that it needs to perform DHCP( ) in order to obtain the necessary information. Then it sends a message to the device to configure the state, so that it also contains the value obtained through DHCP( ) (e.g. Destination IPv6 address). At this point, the network and the device have both a state that indicates the value to use for the DHCP("node1") function. At that point, the standard compression/decompression process takes place.

In the absence of a signalling/control or in-band communications protocol, as well as for optimization, this can also be achieved through asymmetric Contexts. In this case, the network may be able to do DHCP, but not the device, without need to exchange any information. The DEVICE may be using always a Link-Local IPv6 address (e.g. FE80::ABCD) as Source IP address, eliding it, and the network, upon reception can use DHCP( ) to obtain a Global address to put in the packets (e.g. 2001::1234). Downlink messages also get the Global address elided, and replaced upon reception by the Link-Local address. This way, this turns the Compression/Decompression effectively into a NAT.

Finally, in the case when the device does not perform full packet decompression, this could be of benefit for the whole system. The device sends a marker which indicates to the network that it needs to perform DHCP( ) (or any other mechanism) to determine the Source Address to put in the outgoing packet. If there are any downlinks, the Source Address will simply get elided, which would in turn get back to the device, which will only look at marker and know how to process it, without ever caring about which IP address exactly it possesses.

This provides an example where different behaviour may be appropriate for transmission and reception behaviour under the same specification, for example it may not be necessary for the transmitting device to perform a DHCP call to retrieve its own IP address, which it may retrieve from memory in certain embodiments.

Sill further, in the case of implementations using state communications, If the device is the sender, it may be configured to interpret the DHCP( ) operation as an instruction that the NETWORK will perform the DHCP( ) query and will send back the necessary information over the signalling mechanism. It could also mean that the sender should perform the DHCP call, and then send the value to the receiver through the signalling mechanism. It could mean that the device may simply elide the sender IP address, and this address will be filled-in by DHCP( ) at the receiver side.

The first two Field instruction lines use DHCP to get a prefix. The name of the node or its MAC address can be given as parameter. The second pair of Field instruction lines describes the behaviour with neighbour discovery (SLAAC). In that case the MAC address can be provided.

As such, this specification calls for the interrogation of a plurality of data sources. Since the specification divides the IPv6 address into two parts, a single interrogation can be performed at a time, and the retrieved data component from the first interrogation stored e.g. in storage 464 to be used to fulfil the second pair of Field instruction lines and obtain the complete address.

The following entries illustrate how an IPv6 address may be obtained dynamically for a device in accordance with an embodiment using SLAAC

| Field Reference | Target Value | Matching Operator | Processing Instruction |
|---|---|---|---|
| IPv6.prefES | SLAAC(EUI) | Equal | not-sent |
| IPv6.IIDES | SLAAC(EUI) | Equal | not-sent |

This approach might be applied to other fields such as TTL (IPv4) or Hop limit (IPv6) with default values returned by the DHCP or SLAAC.

As a further example of the use of the general approach described above to define the target value, the target value may comprise a marker defined so as to retrieve an application address.

| Field Reference | Target Value | Matching Operator | Processing Instruction |
|---|---|---|---|
| IPv6.prefLA | DNS("coap.ex.io") | Equal | not-sent |
| IPv6.IIDLA | DNS("coap.ex.io")| | Equal | not-sent |

When the data message containing a data component corresponding to the device address arrives at the transmitter processor, the transmitter processor determines the specification to be applicable for example by populating the target value by performing a DNS call as specified in the specification, comparing this to the Application Identifier address field as specified in the field reference (IIDLA=Interface Identifier Local Address), and assuming this matches finding the specification to be applicable, and in view of the "not sent" operation elides the address. When the data message arrives at the receiver processor, the marker is extracted, and in response, the specification set out above is applied to the data message and new DNS operation is performed to obtain the sender's IP address and incorporated in the a reconstituted data message.

Accordingly, the data source, and respective further data component may take an endless variety of forms. For example, the data source may be a DNS server and the marker may indicate the DNS server and an URL. On this basis the further data component may then be an IP address.

For example, the data source may be a DHCP server and the marker may indicate a DHCP server and an MAC address. On this basis the further data component may then be an IP address.

For example, the data source may be an encryption key server adapted to return the public key of a specified entity. On this basis the marker indicates encryption key server and the specified entity.

Use of the Marker to Reference Software Code

The Matching operator, Target Value or Processing Instruction may contain a code written in a software language, such as JavaScript, lua or any other programming language.

The Field ID of the Matching operator or Processing Instruction field may be used to specify the language.

A role of the Matching Operator may be to test the validity of the field value as discussed above. Parameters such as field value (original value in compression, residue for decompression) and target value may be defined. In certain embodiments where the specification includes a call to programming language-like elements, the processing Instruction may be defined in terms of 3 parameters: the function to compress the field, the function to decompress the field and the size in bits that should be returned, although in some cases a variable return size may be specified. The following specification provides an example of operations defined in terms of programming language elements, which as shown are specifically in JavaScript format, although it will be appreciate that any programming language may be used.

| Field Reference | Target Value | Matching Operator | Processing Instruction |
|---|---|---|---|
| Data | 0b1110000 | JS(FV, TV, "FV & TV == TV") | Compress = JS(FV, "[FV, 6]"}, Decompress = JS(CFV, TV, "[CFV << 2|TV, 8]") |

Data is a special field ID which does not correspond to any field in the header packet, but rather specifies the data after the parsed header. The length and the position can be used to isolate a sequence in the data. Additional Position entries in the rule may give the offset and length of the part of the payload to access.

The Processing Instruction will call the process JavaScript with N arguments JS(a,b,c, . . . ), where one of the arguments contains a JavaScript code to be executed. This JavaScript code could be a code snippet (e.g. an single JavaScript expression) or a program consisting of multiple JavaScript functions, which in the end produce the expected result. The expected result for a Matching Operator may be a Boolean value True/False (e.g. the field is matching when "True" and is not matching when "False"). The arguments other than the JavaScript code can provide all information necessary for the execution of the JavaScript code, which includes but is not limited to: the Field Value (FV), Target Value (TV), Compressed Field Value (CFV), the State associated with this data message, the State associated with this data flow, the State associated with this C/D, etc.

When the data message containing a data component having the value 0b1110000 arrives at the transmitter processor, the transmitter processor calls the JavaScript Function ExecuteJavaScript(FieldValue, TargetValue, "FV&TV==TV") as specified in the Matching Operator. The text in quotes defines a valid JavaScript code, which in this case defines an expression to be evaluated, which uses two parameters—FV (corresponding to Field Value) and TV (corresponding to Target Value). Once evaluated, the JavaScript code produces a Boolean value (taking True or False), the expected behaviour for a Matching Operator. For its execution, this expression compares the content specified in the Field Value by means of a Bitwise AND (on the basis of the JavaScript code used in the present example and denoted by "&"), with the value in the Target Value 0 b1110000, and if the result of this Bitwise AND is equal to the Target Value (denoted by ==), the result of the execution evaluates as "True", the specification is determined to be applicable. The Compression and Decompression are also defined with JavaScript expressions, where the Compression is defined JS(FV, "[FV, 6]"}, and the Decompression is defined as JS(CFV, TV, "[CFV«2|TV,8]"). It will be appreciated that this might equally be This split into two functions Compress=JS( ) and Decompress=JS( ).

The compression is determined by executing the function ExecuteJavaScript(FieldValue, "[FV, 6]"), whereas the decompression is obtained by executing the function ExecuteJavaScript(CompressedFieldValue, TargetValue, "[CFV«2|TV,8]").

The compression code "[FV, 6]" returns the variable FV containing in this example the Field Value and the value "6" indicating in this case the number of bits to be retained for sending, and the decompression code "[CFV«2|TV,8]" provides the binary output of the decompressor and the size of the output, where CFV is the variable containing the Compressed Field Value, «2 indicates Binary Shift-Left with 2 bits, | denotes Bitwise OR, TV denotes the Target Value, and 8 indicates the size in bits of the output.

On this basis the compressor replaces the data component with the marker specifying the specification set out above, and a new data value corresponding to a bitwise left shift of the data specified in the Field Reference. When the data message arrives at the receiver processor, the marker is extracted, and in response, the specification set out above is applied to the data message. The JavaScript operation in the Matching Operator field is called and evaluated in the same way as at the transmission side, and the JavaScript operation in the Processing Instruction is called, and in this case the value of the Target Value 0b1110000 incorporated in a reconstituted data message.

Trivial JavaScript operations have been described above by way of example in the interests of simplicity, however it will be appreciated that any operation or sequence of operations may be defined in this manner.

As mentioned above, in some cases the marker may constitute information beyond that contained in the data message. As discussed with reference to elements 470 and 490 of FIG. 4 this information may be added to the datamessage by the receiver processor. In other embodiments, information may be added to the datamessage at the transmission side.

As well as standard programming languages as discussed above, transmission or reception processors may be configured to support a number of processing operations directly. For example:

Delta(x) where a value could be added or subtracted,
Logical functions such as AND, OR, XOR, NOT. For example: the Matching Operator for the IP version NOT 6 may be presumed to return 4.
f(x)=learning(x) where the first message will fill the correct value.
learn the possible values of the LPWAN application that may be in a known range, for example temperature in a room, it can iterate between 19 and 22 degrees, so it is known that Target Value is this range, Matching Operator is "include" and Processing Instruction may be not sent, or sent delta(x)

It will be appreciated that these operations can be implemented in the target value or Matching Operator entries, in which case a Boolean output may be expected, while as implemented for the Processing instruction entry they may be expected to return a value.

Figure 6:
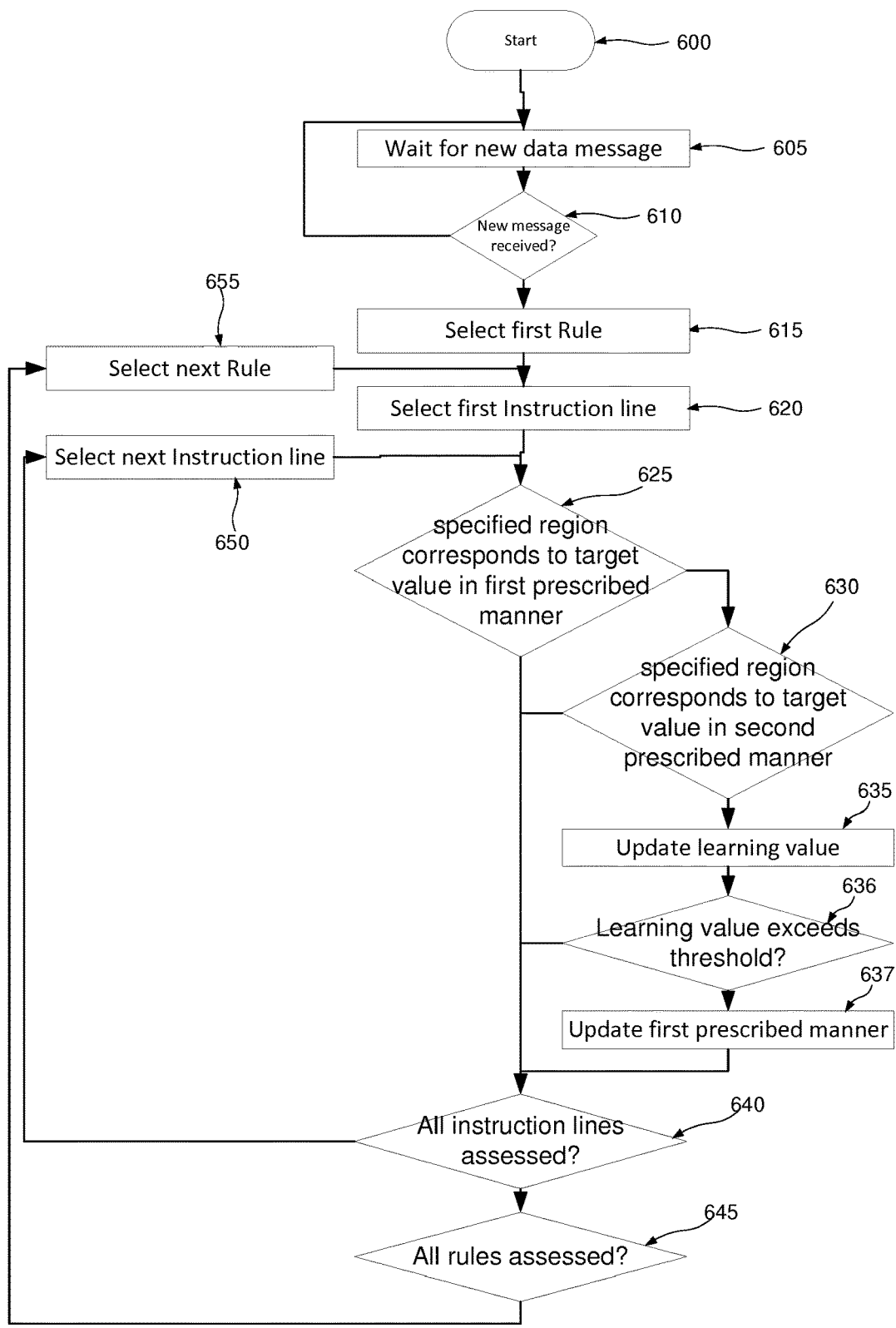
FIG. 6 shows a specification learning algorithm in accordance with an embodiment.

FIG. 6 shows a variant of transmission side processing as introduced with regard to FIG. 4.

FIG. 6 reproduces the transmission side elements 400, 410, 411, 412, 420, and 450 substantially as described with reference to FIG. 4. In the case of FIG. 6 however, at the step of replacing the data component 412 with a marker associated with the first data component type, the marker is 633 is added to the data message outside the structure of the data packet 630.

Use of a Marker to Reference a Centralized Repository

As described above, a marker associated with a specification of a processing operation may be used to define the derivation of a data component from a data source. It will be appreciated that a common data source may be used by a number of devices on this basis. For example, as a data message passes from transmitting device, through a number of network nodes to the receiving device, each device and each node might parse the data message and access a single data source to retrieve the data component. Similarly, messages might be sent to a number of receiving devices, each message referencing the same data source as the source of a data component common to those messages.

Possible applications of this approach may include incorporation of additional information related to device management or security. Examples include identifying the transmission processor, adding a cookie to introduce a state in the processing, authenticate the transmission processor, or adding a sequence number.

This may be seen as defining a context external to a specification that assures a global behaviour for the system. This can be used to generate a value, or call some other function (compression/processing).

In particular, the data component may be a fragmentation checksum, and the source may be a checksum calculator adapted to return a corresponding checksum.

For example in IPv4, the identifier for fragmentation can be generated by the decompressor and must be different for each packet, in IPv6, the flow label can be generated by the decompressor but must be kept equal for a flow. For CoAP Message ID we have the same behaviour as for IPv4 fragmentation id.

Payload Signature

This Processing Instruction may be used to add a signature that covers the entire message together with the Rule ID. This Processing Instruction may be applied in addition to the replace operation at the transmitter or the receiver, for example after compression/decompression is done, and may constitute before sending the SCHC message. This field reference is added to compute the signature and is not part of the message.

| Field Reference | Target Value | Matching Operator | Processing Instruction |
| --- | --- | --- | --- |
| Comp.hash | (None) | ignore | Hash (secret) |

The field instruction line shown is always true at the stage of testing to determine whether the specification is applicable or not in view of the "ignore" matching operator. Assuming this specification is then applied, the processing instruction adds a cryptographic signature function such as a hash to the compressed header residue supporting authentication of the compressor. When the data message arrives at the receiver processor, the marker is extracted, and in response, the specification set out above is applied to the data message. The receiver does the opposite and verifies the hash. If the hash is not correct the frame is discarded. The cryptographic signature function may derive a signature of any input data, including the whole of the data message, or some part thereof. For example, the cryptographic signature function may derive a signature of specific fields, or the output of preceding instruction lines of the same specification.

As such, in accordance with the method of FIG. 2 or 3 the marker may further comprise an encrypted version of the data component. On this basis, the method of FIG. 3 may comprise the further step of using the retrieved encryption key to decrypt the encrypted version of the data component.

Ping Local Management

| Field Reference | Target Value | Matching Operator | Processing Instruction |
|---|---|---|---|
| . . . | . . . | . . . | not-sent |
| IPv6.devIID | . . . | . . . | not-sent |
| IPv6.devIID | . . . | . . . | not-sent |
| ICMPv6.code | 0 | equal | not-sent |
| ICMPv6.type | 128 | equal | not-sent |
| . . . | . . . | . . . | not-sent |
| Compute Ping | . . . | ignore | reply-ping |

The rule describes the IPv6 headers and the ICMPv6 header in the regular way and a comp.ping field is added at the end of the description. When a packet arrives each of its fields are compared to field description and if all the fields matches then the rule is selected. It may be noted that Compute.ping is an example of a case where the Field ID entry does not resolve to a field of the data message, and as such may not be useable in the conventional comparison of a field. As an example here we show an Echo request (ICMPv6 type 128, code 0) that needs a reply, so the Comp.Ping will reply to this ping.

When the receiver processor receives a message coming from the Internet, if the matching is correct, the specification is selected in the usual way. This leads to the execution of the reply-ping Processing Instruction. This Processing Instruction generates a ping reply and sends it to the requester. The Processing Instruction for all fields (except comp.ping) are set to not-sent, so that no residual data is generated. The Processing Instruction for comp.ping is set to an action (ping answer). This action will receive as argument the original packet that trigger the rule selection. This action constructs a ping response with the appropriate parameters (i.e. invert the position of the source and destination addresses and change the icmpv6 code to reply). This answer is sent back to the ping requester and the primary compressor is informed that the marker must not be sent.

The DEViid and APPiid functions as discussed for example in LPWAN Static Context Header Compression (SCHC) and fragmentation for IPv6 and UDP (draft-ietf-lpwan-ipv6-static-context-hc-04) are used to process respectively the Dev and the App Interface Identifiers (Deviid and Appiid) of the IPv6 addresses. The IID value can be computed from the Device ID present in the Layer 2 header. The computation is specific for each LPWAN technology and depends on the Device ID size. In the downstream direction, these may be used to determine the L2 addresses used by the LPWAN.

Use of Markers to Flag Encapsulated Protocols

A first rule describes IPv6 and UDP fields. Then a comp.SCHC field is added.

When a packet arrives each of its fields are compared to field description and if all the fields matches then the rule is selected. It may be noted that Compute.ping is an example of a case where the Field ID entry does not resolve to a field of the data message, and as such may not be useable in the conventional comparison of a field. The Processing Instruction for all fields (except comp.SCHC) are set to appropriate action which may produce some residue value. Then SCHC is recursively called with the remaining header fields, let's say only CoAP. The matching is done and a rule compressing CoAP can be found. In that case a marker is provided as well as residues. The concatenation of the marker and the residue is sent by the first level compression and since this field is described as variable, preceded by the length.

The receiver receives the compressed message. It applies the rule to recover IPv6 and UDP fields and call again the SCHC decompressor on the opaque value to decompress the remaining fields.

In Field ID we can add payload for example by a learning process. In the LPWAN application where most of the usage are for sensors, we can quickly give some ways to learn or compress the payload. If it is desired to put a more global application payload, the payload can be processed as a protocol, so as to learn the possible values of the LPWAN application that may be in a known, in a range, for example temperature in a room, it can iterate between 19 and 22 degrees, so that the Target value may be set as being equal to this range, Matching Operator is include and Processing Instruction may be not-sent, or sent delta(x)

The decompressor calls the Processing Instruction on the transmitted value to process the information. This can lead to reject the frame or to memorize the information or any other treatment.

In some cases the general approaches such as that of FIG. 1 may break down because the transmitting and/or receiving processor is unable to interpret a data message, and identify fields in it, for example because it is encoded in accordance with a protocol that is not supported by the primary compression/decompression mechanism of transmitting and/or receiving processor, e.g. as described above. Since approaches such as that of FIG. 1 a based on the possibility of defining fields for processing, no mechanism is available for handling such anomalous messages.

While as discussed with respect to FIG. 1 the Field Reference of each Field instruction line is generally presumed to correspond to a field of the data message, as designated by the Field Reference, in certain embodiments the Field Reference may be used for other purposes. In particular, where a Field Reference entry is provided that does not validly designate a field of the data message, it may be presumed to perform some other function. For example, where a data message is determined to comply with a protocol other than a protocol supported directly by the primary compression/decompression mechanism of the transmission processor and/or receiving processor, an indication of identity of the unsupported protocol may be provided in a field entry of a field instruction line, which when applied at the receiver side can be used to direct the content in question to a suitable external decoder. Examples of this general approach to the use of the Field Instruction line as presented herein include Protocol id, the Payload signature, the ping process, and the handling of alternative protocols (GHC, RoHC, VJ)

For example, a specification along the following lines may be considered.

| Field Reference | Target Value | Matching Operator | Processing Instruction |
|---|---|---|---|
| UDP.srcPort | 16384 | equal | Not-sent |
| . . . | . . . | . . . | Not-sent |
| Comp.RoHC | None | ignore | RoHC(profile x, compressedformat bits)| |

In this example IPv6 and UDP are compressed in accordance with a primary compression/decompression mechanism as described above, whereas parts of the remaining protocols headers are compressed with a secondary mechanism, e.g. in the case of RTP this could be through the use of RoHC formalism.

The rule describes the IPv6 headers and the UDP header in the regular way (e.g. line by line evaluating the Matching Operator, and after match—executing the Processing Instruction), with the comp.RoHC Processing instruction covering part of the message—in this example—the final protocol headers.

When a packet arrives each of its fields are compared to field description and if all the fields matches then the rule is selected. It may be noted that Compute.ping is an example of a case where the Field ID entry does not resolve to a field of the data message, and as such may not be useable in the conventional comparison of a field. The processing Instruction for all fields (except comp.rohc) are set to appropriate action which may produce some residue value. The Processing Instruction for comp.rohc is set to an action (rohc compression). This action will receive as argument the original packet that triggers the rule selection. The action is to apply the secondary compression following the RoHC algorithm. It may be noted that this action may create a specific state (i.e. stored information) that will be reused by the RoHC compression action to process future messages. The result is given back to the primary compression/decompression mechanism which will send it as an opaque value, that is to say a Value that has no meaning/interpretation/semantics to the primary processing mechanism, but can only be interpreted by some other mechanism. E.g. the value MSLKQSLDKQ may be opaque to the primary processing mechanism, but may represent an encoding which makes perfect sense to RoHC. Note that the comp.RoHC field description can be set to variable to indicate the length of the opaque value.

The receiver receives a compressed header with a marker. The marker helps to find the rule and fields are processed regarding the rule. Fields from IPv6 and UDP are recovered using the primary compression/decompression mechanism. Then the opaque value is given to the RoHC compression action. The RoHC decompression algorithm is used and a field values are recovered. They are added to the uncompressed field description which will be used to reconstruct the original message.

The field instruction line shown is always true at the stage of testing to determine whether the specification is applicable or not in view of the "ignore" matching operator. Assuming this specification is then applied, the processing instruction refers the unprocessable residue as defined by the include(x) target value to a RoHC compressor corresponding to the Field Reference 142 appearing in the Field reference. (Comp.RoHC is the reference for RoHC). Every IETF protocol has a reference ID, which identifies the protocol used, see https://www.iana.org/assignments/protocol-numbers/protocol-numbers.xml these numbers could be used to include different protocols to be processed in the Comp.Protocol. The IANA number identifies protocols of the IETF, these numbers are well-known and may be used in the invention to identify the different protocols to be compute in order to compress a complete header stack. Generally, the first column of the table may be used to identify the header fields of the message, but also the process of payload, data and protocols that do not belong to the original header but will contribute tore duce its size. In the case of protocol one may have: Comp. RoHC, Comp.VJ, Comp.RoHCv2, Comp.SogComp;, Comp.DTLS, Comp.IPSec, etc.

When the data message arrives at the receiver processor, the marker is extracted, and in response, the specification set out above is applied to the data message. The receiver repeats the operation by referring the unprocessable a RoHC decompressor corresponding to the Field Reference comp.RoHC appearing in the Field reference, and calling the result back through the Target value field for incorporation in the output data message.

Another example is to use a generic compression function, such as DEFLATE (as used in ZIP). In this case, an initial dictionary may also be provided to the compression/decompression function. Note, that this is also pertinent to application payload. For example, one may perform lossless compression as well as lossy compression such as JPEG on the payload.

For example, a specification along the following lines may be considered.

| Field Reference | Target Value | Matching Operator | Processing Instruction |
|---|---|---|---|
| ... | ... | ... | not-sent |
| IPv6.devIID | ... | ... | not-sent |
| ... | ... | ... | ... |
| Comp.DEFLATE | None | ignore | DEFLATE(DICTIONNARY)| |

The rule describes the IPv6 headers and the UDP header in the regular way (e.g. line by line evaluating the Matching Operator, and after match—executing the Processing Instruction), with the comp.DEFLATE Processing instruction covering part of the message—in this example—the final protocol headers.

This can be used also for encapsulated instances of compression in accordance with embodiments as described herein, such that multiple recursive applications of the embodiments may be envisaged, for instance when some parts are encrypted, to reduce the number of specifications by dividing the specification into several parts. Could also be useful for OSCORE where two COAP header are defined.

Specification Learning

In certain embodiments specifications may indicate to the transmitter or receiver processor that some of the values can be obtained, refined, replaced or otherwise determined through a learning process.

This learning process may be based on Statistical Sampling, Bayesian Networks, Neural Networks, Genetic Algorithms, Machine Learning, Data Mining, or any other form of process, which takes into account the particular characteristics of a given data flow, device, deployment scenario, transmitter or receiver processor capabilities, and so forth.

As an example, a generic device (e.g. thermometer) may be deployed in an office building, where the temperature is always around 22 degrees Celsius. The transmitter or receiver processor can use any of the above-mentioned algorithms to determine after several days of work the value "22" requires improved compression and allocate a new specification especially for it. The same device, deployed in a factory, may send temperatures in the range 30-35 degrees, in which case, the payload compression would be optimized for this range.

The learning algorithm can be symmetric, e.g. both the sender and the receiver can perform the learning process on their side. In the above example, the generic thermometer can have the learning algorithm indicate that after 5 consecutive messages with a particular temperature (e.g. 22° C.), a new specification with a marker equal to 10 will be set to this value. This happens also on the receiver, which observing the 5 past values learns that the value for the marker=10 is to be set to 22° C.

The process can also be asymmetric, which is there may be the need to have a signalling protocol for example as outlined above, which would synchronize the two transmitter or receiver processor instances. For example, the network may comprise the element providing the learning algorithm, which then updates the corresponding values to the end device.

This could be the case for the use with Comp.DEFLATE, where the NETWORK may determine a better DEFLATE dictionary and update the one at the end-device.

The learning process may modify the State, which could have multiple implications on the Compression/Decompression process, such as:
Enable or Disable a particular Rule.
This could be achieved for example, by having a Matching Operator that consults a variable in the local State. This variable can indicate that the Matching Operator is always False (e.g. the Rule never matches) until the learning process has achieved some objective.
This could be also achieved directly through the TargetValue.
Modify one or more of the Target Values of one or more Rules. One example would be to have RuleID==100 be disabled until a particular IPv6 destination address was matched 5 times, after which, the TargetValue of RuleID would become equal to this particular IPv6 address, which would enable the Rule with RuleID==100.

A possible way to realize this is to have the Matching Operator perform the learning phase, and when some internal condition is met—to update the TargetValue. This could be achieved through the use of pair Learning Matching Operator (LMO)-Learned Target Value (LTV), where the LMO is updating the state of the LTV on the same line of the same rule, or it could be that one LMO updates the state of one or more LTV from any of the lines on any of the rules. It could be additionally the case that an LMO can perform the learning, which can affect the state of any of the functions on this C/D. Note that the learning can be performed in any function, e.g. in the Compression/Decompression Actions as well.

FIG. 6 shows a specification learning algorithm in accordance with an embodiment. As shown in FIG. 6 the method starts at step 600 before proceeding to step 605 at which the next data message is awaited.

By way of example the method of FIG. 6 is described in a scenario wherein there defined a one or more rules, corresponding to specifications as described above, each rule comprising one or more field instruction lines, each field instruction line comprising a target value and a processing instruction.

If it is determined at step 610 that a new data message has been received the method proceeds to step 615 at which a first rule is selected for assessment. The method then proceeds to step 620 at which the first instruction line of the currently selected rule is considered for assessment. If the specified region of the data message corresponds to the target value in a first respective prescribed manner, e.g. if the field value matches the target value, the method proceeds to step 640 at which it is determined whether the instruction line currently under consideration is the last. In a case where it is determined at step 640 that the instruction line currently under consideration is the last the method proceeds to step 645 at which it is determined whether the rule currently under consideration is the last. In a case where it is determined at step 645 that the rule currently under consideration is the last the method processes the data packet in accordance with the matching rule in the usual way as discussed with reference to FIG. 1 before reverting to step 605. In a case where it is determined at step 640 that the instruction line currently under consideration is not the last the method proceeds to step 650 at which the next instruction line is selected before reverting to step 625. In a case where it is determined at step 645 that the rule currently under consideration is not the last the method proceeds to step 655 at which the next rule is selected before reverting to step 615. In this way the method loops through all fields of all rules in order to find the matching rule as discussed with reference to FIG. 1. In a case where the specified region of the data message does not correspond to the target value in a first respective prescribed manner at step 625, e.g. if the field value matches the target value, the method proceeds to step 630 at which it is determined whether the specified region of the data message corresponds to the target value in a second respective prescribed manner, e.g. as determined by the Learning Matching Operator as introduced above For example, the data message may deviate from the target value within a particular range. Where this is the case, the method proceeds to step 635 at which a learning value indicating the number of times the whether the specified region of the data message has been found to correspond to the target value in the second respective prescribed manner. The method next proceeds to step 636 at which it is determined whether the learning value exceeds a threshold, and in a case where the threshold is exceeded, the first prescribed manner of the instruction line under consideration is update, for example to match the second prescribed manner before reverting to step 640. If the learning value is found not to exceed the threshold at step 635, the method reverts directly to step 640.

As such there is provided a method of processing a plurality of data messages wherein there are defined a one or more rules, each rule comprising one or more field instruction lines, each said field instruction line comprising a target value and a processing instruction;

the method comprising the further steps of determining for a rule whether a respective specified region of each data message corresponds to the target value in a respective prescribed manner, and in a case where the respective specified region does not corresponds to the target value in the respective prescribed manner for each field instruction line in a respective rule for a predetermined number of the data messages, modifying the target value in a predetermined manner.

| Field Reference | Target Value | Matching Operator | Processing Instruction |
|---|---|---|---|
| Field1 | LearnedValue( ) | Learn("max5") | not-sent-or-sync( ) |

The example illustrated in the above table shows how an LTV and an LMO could function together. The skilled person will appreciate that this is a simplified structure, and that additional columns may be added in addition to the Target Value,Matching operator and Processing instruction fields. For Field1, the LMO "Learn" denotes a learning function, which takes one parameter—the name of the evaluation criteria ("max5"). This function is a Matching Operator, which returns "True" when the learning process has achieved sufficient performance (e.g. when the evaluation criteria is met), and "False" otherwise. The evaluation criteria in this case could indicate that the last 5 messages contained the same value. In this scenario, this value could be accepted as the value for the Target Value. When the evaluation criteria is met, the Rule will match the Data message, and the Compression/Decompression Action will be invoked to compress the Data Message, with the LearnedValue( ) as input. The LearnedValue( ) returns the result of the Learn function, which is then processed by the not-sent-or-sync( ) CDA.

In this example not-sent-or-sync( ) is a function that takes into account the State of the SENDER and the RECEIVER and makes use of the existence of a SIGNALING/CONTROL mechanism. If the State of the SENDER and RECEIVER differs or is unknown regarding the value to be transmitted, it indicates this in the output value, and potentially invokes the SIGNALING/CONTROL protocol. It acts as not-sent whenever the State of both SENDER and RECEIVER regarding the value to be sent is known to be the same (e.g. through previous exchanges). For example, this could be implemented as having a Variable Length Output, which whenever the length is 0 indicates that no synchronization of the States is necessary, and if greater than 0, contains a Structured Variable Length Marker (SVLM), which provides the necessary update of the State.

Another example is the use of predefined dictionaries for a generic compression algorithm, such as DEFLATE. For example, the NETWORK can perform processor-intensive dictionary update, and after reaching a certain criteria (e.g. 10% better compression ratio with the new dictionary compared to the current/generic one), can send the new dictionary to be used for the DEFLATE function by the DEVICE.

Figure 7:
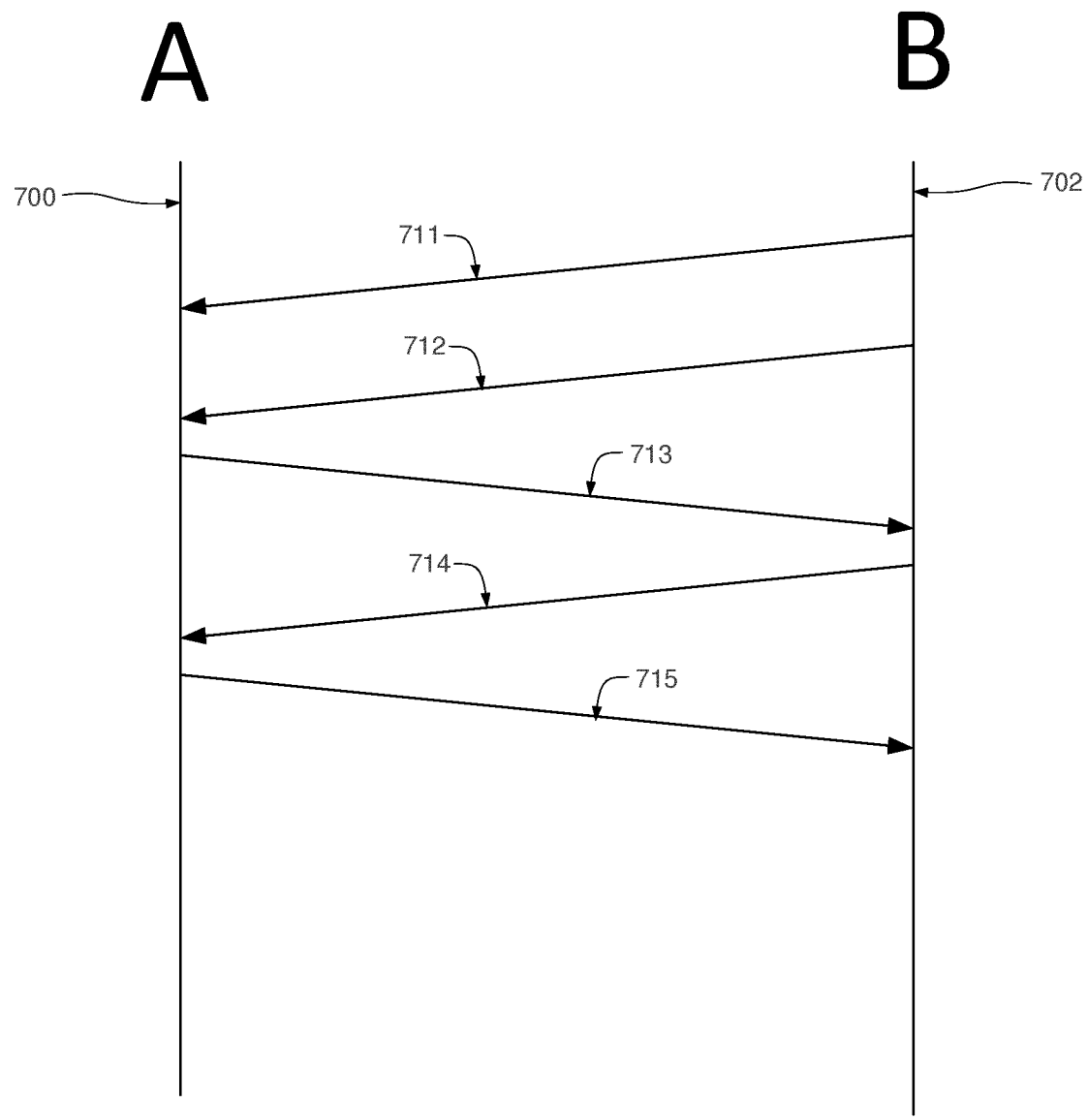
FIG. 7 presents an example of specification learning via state communications in accordance with an embodiment.

FIG. 7 presents an example of specification learning via state communications in accordance with an embodiment. The scenario of FIG. 7 provides a situation which might be implemented by a method as described with reference to FIG. 6. As shown, a series of communications 711, 712, 713, 714, 715 occur between a first device A 700 and a second device B 701. At the beginning the learning phase is not yet performed.

A is a node with an identity (aa-bb-vvvvv-yyyyy), this identity is not known at the rule creation and can be dynamically defined. A has two rules defined one carrying the identity, the other without. Imagine a very simple protocol sending identity and value. Rules might be defined as follows:

Rule A1

| Field Reference | Target Value | Matching Operator | Processing Instruction |
| --- | --- | --- | --- |
| ID | none | ignore | Value-sent |
| value | none | ignore | Value sent |

Rule A2

| Field Reference | Target Value | Matching Operator | Processing Instruction |
| --- | --- | --- | --- |
| ID | none | ignore | Not-sent |
| value | none | ignore | Value sent |

B is a decompressor that needs to learn the identity of device A. B has defined two rules (B1 and B2) that have the same content, but B1 is used when the identity of A is unknown and B2 is used when the identity of A is known.

Rule B1

| Field Reference | Target Value | Matching Operator | Processing Instruction |
| --- | --- | --- | --- |
| ack | none | ignore | Value-sent |

Rule B2

| Field Reference | Target Value | Matching Operator | Processing Instruction |
| --- | --- | --- | --- |
| ack | none | ignore | Not-sent |

The device A 700 receives messages 711, 712 from Device B 701 compressed with specification B1 and then decompressed in accordance with specification A1. Since specification B1 requests an acknowledgement, device A 700 responds with a message 713 also compressed specification A1 and then decompressed in accordance with specification B1. This message 713 contains the ID and Value fields as transmitted in accordance with specification A1. When the reception processor of device B receives this, it can learn the ID of device B On this basis Device B may then send its next communication 714 using specification B2, which does not request an acknowledgement. On this basis, device A can select specification A2 for its next Communications 715, which does not include ID information, thereby increasing the degree of compression for ongoing Communications.

If Device B 701 reboots then it may revert to the initial specification and then the device A 700 will have to resend the learning information. If the device A 700 changes its learning information it can also revert to Rule 1 again.

As discussed above, data messages such as data packets in an IPv4 orIPv6 format are processed with a view to compression/decompression, using information obtained from sources other than the data packet itself, or the stream to which it belongs. This may involve additional dynamic processing defined in specifications identified by a shared marker, or obtained from an additional data source such as a static file, database application or the like. Embodiments described herein enhance this approach with a dynamic determination of data components.

Software embodiments include but are not limited to application, firmware, resident software, microcode, etc. The invention can take the form of a computer program product accessible from a computer-usable or computer-readable medium providing program code for use by or in connection with a computer or an instruction execution system. Software embodiments include software adapted to implement the steps discussed above with reference to FIGS. 1 to 4. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

In some embodiments, the methods and processes described herein may be implemented in whole or in part by a user device. These methods and processes may be implemented by computer-application programs or services, an application-programming interface (API), a library, and/or other computer-program product, or any combination of such entities.

The user device may be a mobile device such as a smart phone or tablet, a drone, a computer or any other device with processing capability, such as a robot or other connected device, including IoT (Internet of Things) devices.

Figure 8:
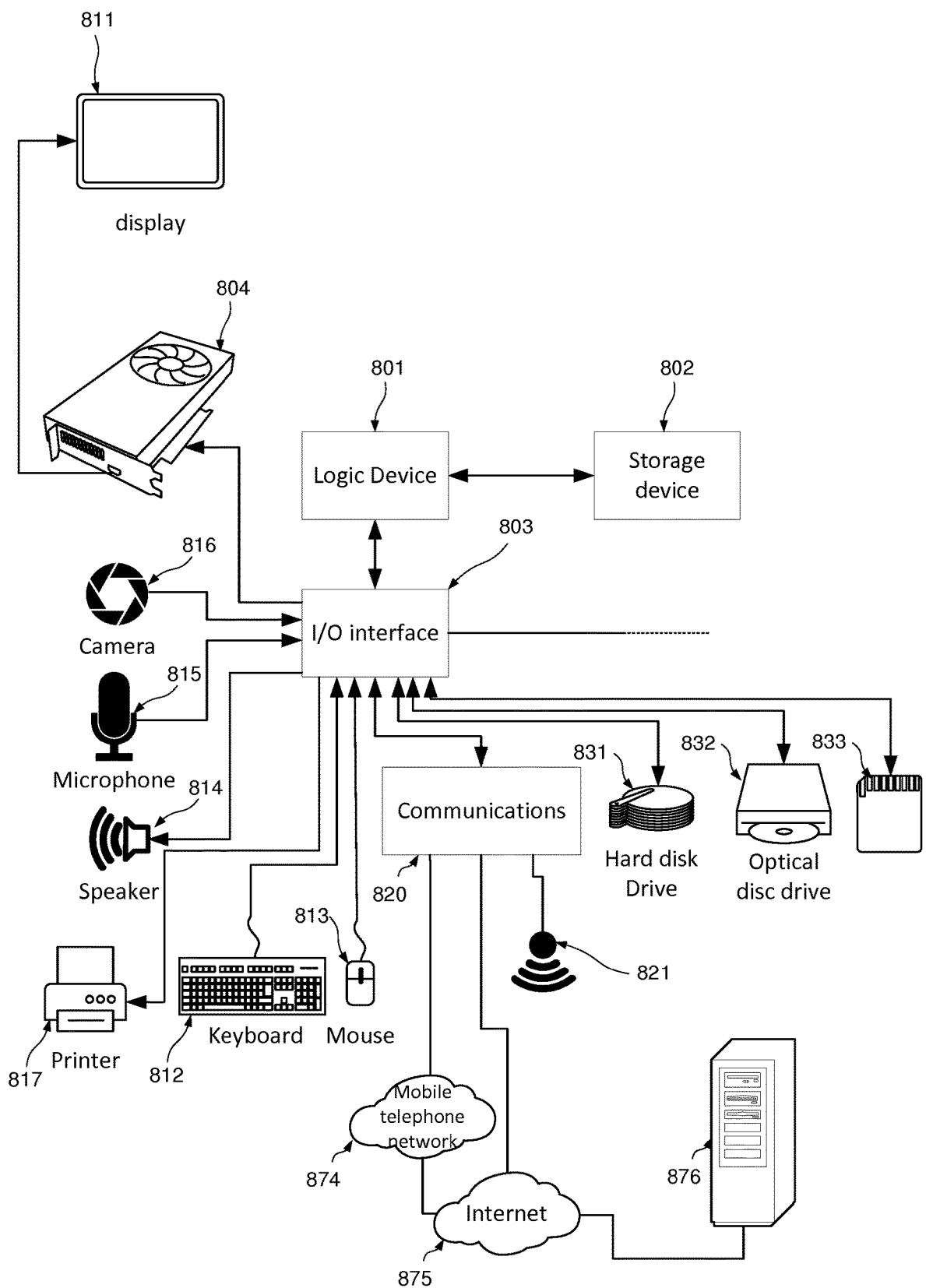
FIG. 8 shows a generic computing system suitable for implementation of embodiments of the invention.
Figure 9:
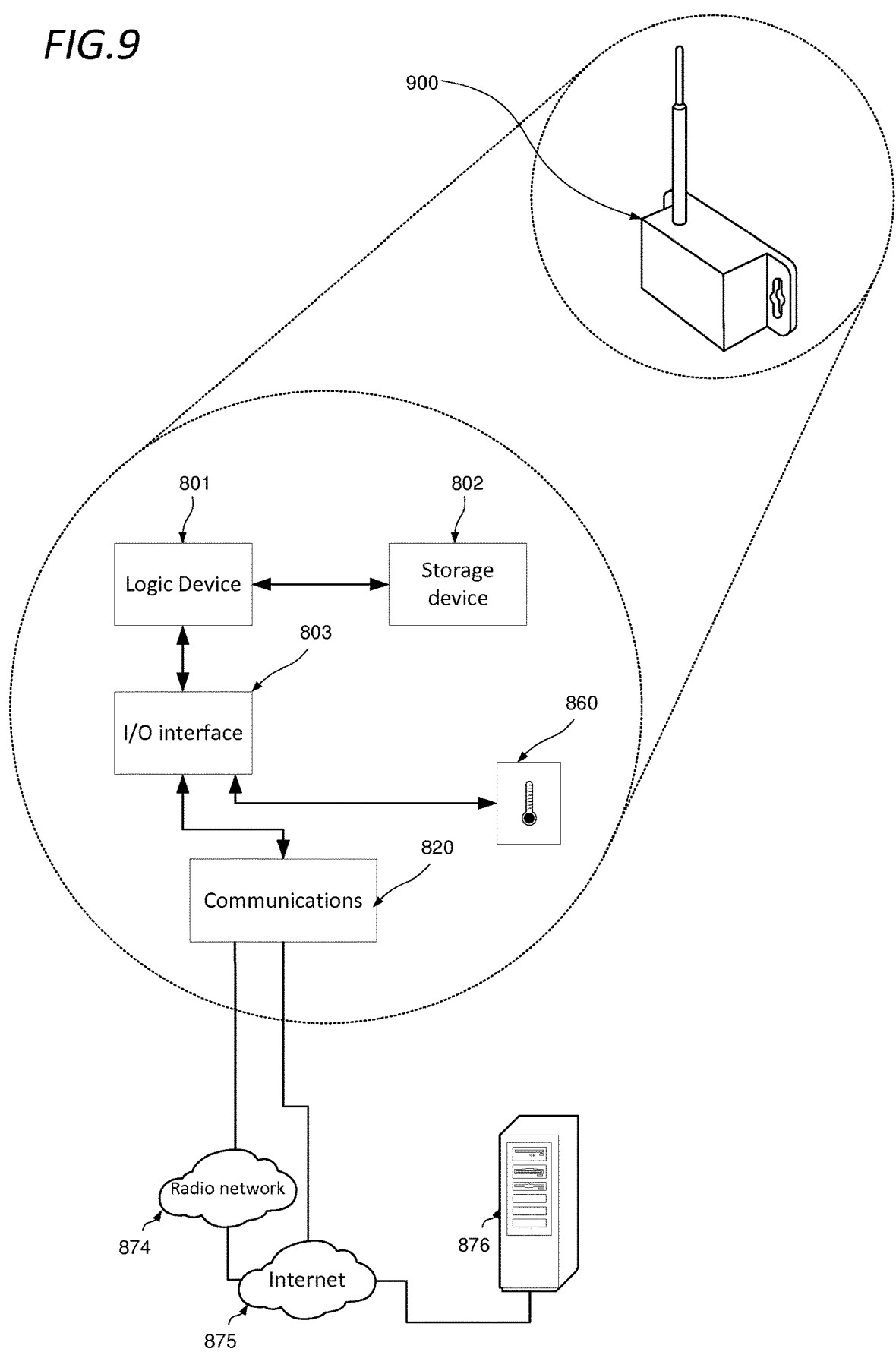
FIG. 9 shows a standalone sensor device adaptable to constitute an embodiment.

FIG. 8 shows a generic computing system suitable for implementation of embodiments of the invention.

A shown in FIG. 8, a system includes a logic device 801 and a storage device 802. The system may optionally include a display interface 804 and display 811, input/output subsystem 803, communication subsystem 820, and/or other components not shown.

Logic device 801 includes one or more physical devices configured to execute instructions. For example, the logic device 801 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device 801 may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device 801 optionally may be distributed among two or more separate devices, which may be remotely located and/or configured for coordinated processing. Aspects of the logic device 1001 may be virtualized and executed by remotely accessible, networked computing devices configured in a cloud-computing configuration.

Storage device 802 includes one or more physical devices configured to hold instructions executable by the logic device to implement the methods and processes described herein. When such methods and processes are implemented, the state of storage 802 device may be transformed—e.g., to hold different data.

Storage device 802 may include removable and/or built-in devices. Storage device may be locally or remotely stored (in a cloud for instance). Storage device 802 may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, floppy-disk drive, tape drive, MRAM, etc.), among others. Storage device may include volatile, non-volatile, dynamic, static, read/write, read-only, random-access, sequential-access, location-addressable, file-addressable, and/or content-addressable devices. In certain arrangements, the system may comprise an interface 803 adapted to support communications between the logic device 801 and further system components. For example, additional system components may comprise removable and/or built-in extended storage devices. Extended storage devices may comprise one or more types of storage device including optical memory 832 (e.g., CD, DVD, HD-DVD, Blu-Ray Disc, etc.), semiconductor memory 833 (e.g., RAM, EPROM, EEPROM, FLASH etc.), and/or magnetic memory 831 (e.g., hard-disk drive, floppy-disk drive, tape drive, MRAM, etc.), among others. Such extended storage device may include volatile, non-volatile, dynamic, static, read/write, read-only, random-access, sequential-access, location-addressable, file-addressable, and/or content-addressable devices.

It will be appreciated that storage device includes one or more physical devices, and excludes propagating signals per se. However, aspects of the instructions described herein alternatively may be propagated by a communication medium (e.g., an electromagnetic signal, an optical signal, etc.), as opposed to being stored on a storage device.

Aspects of logic device 801 and storage device 802 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device 802. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

In particular, the system of FIG. 8 may be used to implement embodiments of the invention.

For example a program implementing the steps described with respect to FIGS. 2 to 5, or the algorithms presented above may be stored in storage device 802 and executed by logic device 801. The data message and/or data component may be received and/or transmitted via the communications interface 820, and in particular via radio network 874 or the internet 875. The Context or individual specifications may be received and/or transmitted via the communications interface 820, and in particular via radio network 874 or the internet 875. The data message, and/or data component may be buffered or otherwise stored in storage device 802, 831, 832, 833. The Context or individual specifications may be stored in storage device 802, 831, 832, 833. The data message, and/or data component may be User The functions of any or all of the units 420, 470, or any or all of their respective sub units, may similarly be implemented by a program performing the required functions, in communication with additional dedicated hardware units as necessary. Accordingly the invention may be embodied in the form of a computer program.

It will be appreciated that a "service", as used herein, is an application program executable across multiple user sessions. A service may be available to one or more system components, programs, and/or other services. In some implementations, a service may run on one or more server-computing devices.

When included, display subsystem 811 may be used to present a visual representation of data held by a storage device. This visual representation may take the form of a graphical user interface (GUI). As the herein described methods and processes change the data held by the storage device 802, and thus transform the state of the storage device 802, the state of display subsystem 811 may likewise be transformed to visually represent changes in the underlying data. Display subsystem 811 may include one or more display devices utilizing virtually any type of technology for example as discussed above. Such display devices may be combined with logic device and/or storage device in a shared enclosure, or such display devices may be peripheral display devices. An audio output such as speaker 814 may also be provided.

When included, input subsystem may comprise or interface with one or more user-input devices such as a keyboard 812, mouse 813, touch screen 811, or game controller (not shown). In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone 815 for speech and/or voice recognition; an infrared, colour, stereoscopic, and/or depth camera 816 for machine vision and/or gesture recognition; a head tracker, eye tracker, accelerometer, and/or gyroscope for motion detection and/or intent recognition; as well as electric-field sensing componentry for assessing brain activity. The input/output interface 803 may similarly interface with a loudspeaker 814, vibromotor or any other transducer device as may occur to the skilled person. For example, the system may interface with a printer 817.

When included, communication subsystem 820 may be configured to communicatively couple computing system with one or more other computing devices. For example, communication module of communicatively couple computing device to remote service hosted for example on a remote server 876 via a network of any size including for example a personal area network, local area network, wide area network, or internet. Communication subsystem may include wired and/or wireless communication devices compatible with one or more different communication protocols. As non-limiting examples, the communication subsystem may be configured for communication via a wireless telephone network 874, or a wired or wireless local- or wide-area network. In some embodiments, the communication subsystem may allow computing system to send and/or receive messages to and/or from other devices via a network such as Internet 875. The communications subsystem may additionally support short range inductive communications with passive or active devices (NFC, RFID, UHF, etc). In certain variants of the embodiments described above, the traffic data may be received via the radio network 874 or Internet 875.

The system of FIG. 8 is intended to reflect a broad range of different types of information handling system. It will be appreciated that many of the subsystems and features described with respect to FIG. 8 are not required for implementation of the invention, but are included to reflect possible systems in accordance with the present invention. It will be appreciated that system architectures vary widely, and the relationship between the different sub-systems of FIG. 8 is merely schematic, and is likely to vary in terms of layout and the distribution of roles in systems. It will be appreciated that, in practice, systems are likely to incorporate different subsets of the various features and subsystems described with respect to FIG. 8.

Examples of devices comprising at least some elements of the system described with reference to FIG. 8 and suitable for implementing embodiments of the invention include cellular telephone handsets including smart phones, and vehicle navigation systems, distributed sensors, smart domestic appliances, connected industrial infrastructure equipment Smart city implementations or components, smart energy consumption implementations or components, finding articles or persons, medical, emergency services, agriculture, wearable sensors for humans and other species and so on.

FIG. 8 shows a standalone sensor device adaptable to constitute an embodiment. The standalone sensor device 800 of FIG. 8 may represent a typical "Internet of Things" component. Such devices are often subject to significant constraints in terms of communications bandwidth, power consumption, processing and memory capacity, and as such may benefit from many of the mechanisms presented in the foregoing discussion. As shown in FIG. 8, the standalone sensor device incorporates elements 801, 802, 803, 820, and sensor device 860. It is in communication with the radio network 874 and a server 876 via the network 875. Alternative communication mechanisms such as a dedicated network or Wi-Fi may also be used.

As shown the sensor device is a temperature sensor, however it will be appreciated that it might equally embody any other type of sensor, or other transducer, or a plurality of transducers as appropriate to the role of the device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of processing a data message for transmission, said method comprising the steps of parsing a field of said data message for a data component of a first type, where said data component of said first type is derivable from a data source other than a data stream associated with said data message, adding a marker to said data message, said marker being associated with a specification of a processing operation defining said derivation, wherein there are defined one or more rules, each said rule comprising one or more field instruction lines, each said field instruction line comprising a target value and a processing instruction;

said method comprising the further steps of determining, for said rule, whether a respective specified region of said data message corresponds to said target value in a respective prescribed manner, and in a case where said respective specified region corresponds to said target value in said respective prescribed manner for each field instruction line in a respective said rule, applying the processing instruction of each field instruction line in said corresponding rule with regard to the respective specified region, wherein said data component is processed as defined by said processing instruction.

2. The method of claim 1 wherein said step of adding a marker associated with said first data component type to said data message comprises replacing said data component with said marker.

3. The method of claim 1, wherein said data source is a DNS server and wherein said marker indicates said data source and an URL, and wherein said substitute data is an IP address.

4. The method of claim 1, wherein said data source is a DHCP server and wherein said specification indicates said data source and an MAC address and wherein said further data component is an IP address.

5. The method of claim 1, wherein said data source is an encryption key server adapted to return an encryption key of a specified entity, and wherein said specification indicates said data source and said specified entity.

6. The method of claim 1, wherein said marker further comprises an encrypted version of said data component, said method comprising the further step of using said retrieved encryption key to decrypt said encrypted version of said data component.

7. The method of claim 1, wherein said data component is a fragmentation checksum, and wherein said source is a checksum calculator adapted to return a corresponding checksum.

8. The method of claim 1, wherein there are defined a one or more rules, each said rule comprising one or more field instruction lines, each said field instruction line comprising a target value and a processing instruction; said method comprising the further steps of determining for a said rule whether a respective specified region of said data message corresponds to said target value in a respective prescribed manner, and in a case where said respective specified region corresponds to said target value in said respective prescribed manner for each field instruction line in a respective said rule, applying the processing instruction of each field instruction line in said corresponding rule with regard to the respective specified region, wherein said data component processed as defined by said processing instruction.

9. A non-transitory, computer-readable medium comprising instructions executable by at least one processor to perform a method, the method comprising the steps of claim 1.

10. A method of processing a received data message, said method comprising the steps of extracting a marker associated with a first data component type from said data message, and deriving a further data component by means of a processing operation with respect to a data source other than a data stream associated with said data message, where said processing operation is defined in a specification associated with said marker, wherein there are defined one or more rules, each said rule comprising one or more field instruction lines, each said field instruction line comprising a target value and a processing instruction;
said method comprising the further steps of determining, for said rule, whether a respective specified region of said data message corresponds to said target value in a respective prescribed manner, and in a case where said respective specified region corresponds to said target value in said respective prescribed manner for each field instruction line in a respective said rule, applying the processing instruction of each field instruction line in said corresponding rule with regard to the respective specified region, wherein said data component is processed as defined by said processing instruction.

11. The method of claim 10, comprising the further step of reconstituting said data component with said further data component.

12. The method of claim 10, comprising the further step of adding said further data component to said data message.

13. The method of claim 10, comprising the further step of storing said further data component, and in a further iteration of said step of parsing a region of a further data message for a marker associated with a first data component type, retrieving said stored substitute data instead of repeating said step of interrogating a data source associated with said marker.

14. A method of processing a received data message, said method comprising the steps of extracting a marker associated with a first data component type from said data message, and deriving a further data component by means of a processing operation with respect to a data source other than a data stream associated with said data message, where said processing operation is defined in a specification associated with said marker, and comprising the further step of storing said further data component, and in a further iteration of said step of parsing a region of a further data message for a marker associated with a first data component type, retrieving said stored substitute data instead of repeating said step of interrogating a data source associated with said marker.

15. The method of claim 14, comprising the further step of reconstituting said data component with said further data component.

16. The method of claim 14, comprising the further step of adding said further data component to said data message.

17. A transmission processor for processing a data message, said transmission processor being adapted to parsing a field of said data message for a data component of a first type, where said data component of said first type is derivable from a data source other than a data stream associated with said data message, and to adding a marker to said data message, said marker being associated with a specification of a processing operation defining said derivation, wherein there are defined one or more rules, each said rule comprising one or more field instruction lines, each said field instruction line comprising a target value and a processing instruction;
said method comprising the further steps of determining, for said rule, whether a respective specified region of said data message corresponds to said target value in a respective prescribed manner, and in a case where said respective specified region corresponds to said target value in said respective prescribed manner for each field instruction line in a respective said rule, applying the processing instruction of each field instruction line in said corresponding rule with regard to the respective specified region, wherein said data component is processed as defined by said processing instruction.

18. A reception processor for processing a received data message, said reception processor being adapted to extract a marker associated with a first data component type from said data message, and to derive a further data component by means of a processing operation with respect to a data source other than a data stream associated with said data message, where said processing operation is defined in a specification associated with said marker, wherein there are defined one or more rules, each said rule comprising one or more field instruction lines, each said field instruction line comprising a target value and a processing instruction;
said method comprising the further steps of determining, for said rule, whether a respective specified region of said data message corresponds to said target value in a respective prescribed manner, and in a case where said respective specified region corresponds to said target value in said respective prescribed manner for each field instruction line in a respective said rule, applying the processing instruction of each field instruction line in said corresponding rule with regard to the respective specified region, wherein said data component is processed as defined by said processing instruction.

19. A reception processor for processing a received data message, said reception processor being adapted to extract a marker associated with a first data component type from said data message, and to derive a further data component by means of a processing operation with respect to a data source other than a data stream associated with said data message, where said processing operation is defined in a specification associated with said marker, and comprising the further step of storing said further data component, and in a further iteration of said step of parsing a region of a further data message for a marker associated with a first data component type, retrieving said stored substitute data instead of repeating said step of interrogating a data source associated with said marker.

* * * * *